United States Patent
Hirata et al.

(10) Patent No.: US 12,325,302 B2
(45) Date of Patent: *Jun. 10, 2025

(54) LIGHT SOURCE APPARATUS, AND INFORMATION DISPLAY SYSTEM AND HEAD-UP DISPLAY APPARATUS USING THE SAME

(71) Applicant: Maxell, Ltd., Kyoto (JP)

(72) Inventors: Koji Hirata, Kyoto (JP); Toshinori Sugiyama, Kyoto (JP); Koji Fujita, Kyoto (JP); Kouichi Kajiwara, Kyoto (JP); Eiji Takagi, Kyoto (JP)

(73) Assignee: MAXELL, LTD., Kyoto (JP)

( * ) Notice: Subject to any disclaimer, the term of this patent is extended or adjusted under 35 U.S.C. 154(b) by 485 days.

This patent is subject to a terminal disclaimer.

(21) Appl. No.: 17/770,295

(22) PCT Filed: Oct. 7, 2020

(86) PCT No.: PCT/JP2020/038053
§ 371 (c)(1),
(2) Date: Apr. 20, 2022

(87) PCT Pub. No.: WO2021/079741
PCT Pub. Date: Apr. 29, 2021

(65) Prior Publication Data
US 2022/0388396 A1    Dec. 8, 2022

(30) Foreign Application Priority Data

Oct. 21, 2019  (JP) .................... 2019-191685
May 25, 2020  (JP) .................... 2020-090189

(51) Int. Cl.
B60K 35/00    (2024.01)
B60K 35/23    (2024.01)
(Continued)

(52) U.S. Cl.
CPC .............. *B60K 35/00* (2013.01); *B60K 35/23* (2024.01); *B60K 35/60* (2024.01); *B60K 35/65* (2024.01);
(Continued)

(58) Field of Classification Search
CPC .. B60K 35/00; B60K 35/65; B60K 2360/785; B60K 35/23; B60K 2360/336;
(Continued)

(56) References Cited

U.S. PATENT DOCUMENTS 4,961,625 A * 10/1990  Wood ..................... G02B 27/01
                                                      359/708
5,504,622 A *  4/1996  Oikawa .................. B60K 35/60
                                                      359/630
(Continued)

FOREIGN PATENT DOCUMENTS

JP    2010-78795 A    4/2010
JP    2019-3081 A     1/2019
(Continued)

OTHER PUBLICATIONS

International Search Report mailed on Dec. 28, 2020, received for PCT Application PCT/JP2020/038053, Filed on Oct. 7, 2020, 10 pages including English Translation.
(Continued)

*Primary Examiner* — Luis A Martinez Borrero
(74) *Attorney, Agent, or Firm* — XSENSUS LLP

(57) ABSTRACT

In an information display system that allows an observer to visually recognize image information displayed on an image display apparatus by superimposing the image on an external scenery through a window glass and a combiner, the system includes a light source apparatus that supplies light having a specific polarization direction at a narrow divergence angle to the image display apparatus, a reflection
(Continued)

position of the image is changed by arranging a position and an angle of the image display apparatus with respect to the window glass so that the position and the angle change while a monitoring angle of the image visually recognized by the observer is constant, and a virtual image display distance of the image visually recognized by the observer and a size of the image of the virtual image can be changed by the arrangement state in the vehicle.

13 Claims, 21 Drawing Sheets

(51) Int. Cl.
    *B60K 35/60*        (2024.01)
    *B60K 35/65*        (2024.01)

(52) U.S. Cl.
    CPC .... *B60K 2360/23* (2024.01); *B60K 2360/336* (2024.01); *B60K 2360/347* (2024.01); *B60K 2360/349* (2024.01); *B60K 2360/785* (2024.01)

(58) Field of Classification Search
    CPC .............. B60K 35/60; B60K 2360/347; B60K 2360/349; B60K 2360/23
    See application file for complete search history.

(56) References Cited

U.S. PATENT DOCUMENTS

| | | | | |
|---|---|---|---|---|
| 5,587,836 | A * | 12/1996 | Takahashi | G02B 27/0172 359/640 |
| 5,657,163 | A * | 8/1997 | Wu | G02B 6/4298 359/633 |
| 5,760,931 | A * | 6/1998 | Saburi | G02B 27/0149 359/13 |
| 9,429,764 | B2 * | 8/2016 | Harrold | H04N 13/371 |
| 9,462,214 | B2 * | 10/2016 | Kobayashi | G02B 27/0101 |
| 10,165,237 | B2 * | 12/2018 | Henon | H04N 9/3144 |
| 10,191,290 | B2 * | 1/2019 | Ye | G02B 27/0101 |
| 10,994,613 | B2 * | 5/2021 | Hirata | G02B 27/0101 |
| 11,487,115 | B2 * | 11/2022 | Misawa | B60K 35/00 |
| 11,586,040 | B2 * | 2/2023 | Hirata | B60K 35/29 |
| 11,828,938 | B2 * | 11/2023 | Hirata | B60K 35/23 |
| 11,846,776 | B2 * | 12/2023 | Misawa | G02B 27/0101 |
| 12,038,580 | B2 * | 7/2024 | Hirata | B60K 35/00 |
| 2008/0186587 | A1 * | 8/2008 | Matsushita | G02B 27/0101 359/630 |
| 2009/0115975 | A1 * | 5/2009 | Ogura | G03B 21/30 353/98 |
| 2010/0066645 | A1 * | 3/2010 | Ishii | G02B 27/0101 345/7 |
| 2012/0099032 | A1 * | 4/2012 | Ishikawa | G02B 27/0101 349/11 |
| 2012/0182610 | A1 * | 7/2012 | O'Hara | G03B 21/10 359/460 |
| 2013/0100524 | A1 * | 4/2013 | Magarill | G02B 17/08 359/364 |
| 2013/0149503 | A1 | 6/2013 | Yamamoto et al. | |
| 2013/0286678 | A1 | 10/2013 | Sugiyama et al. | |
| 2014/0152711 | A1 * | 6/2014 | Sekiya | B60K 35/00 345/690 |
| 2014/0268358 | A1 * | 9/2014 | Kusaka | G02B 27/0103 359/630 |
| 2015/0211877 | A1 * | 7/2015 | Laycock | G01C 21/365 349/11 |
| 2015/0219895 | A1 * | 8/2015 | Laycock | G02B 27/0101 359/737 |
| 2016/0147074 | A1 * | 5/2016 | Kobayashi | G02B 3/0068 345/7 |
| 2016/0195719 | A1 * | 7/2016 | Yonetani | B60K 35/00 359/633 |
| 2016/0266283 | A1 * | 9/2016 | Segawa | G02B 5/0257 |
| 2017/0092169 | A1 * | 3/2017 | Kuzuhara | G09G 3/007 |
| 2017/0146803 | A1 * | 5/2017 | Kishigami | G02B 27/0149 |
| 2017/0160551 | A1 * | 6/2017 | Azuma | H05B 3/84 |
| 2017/0212346 | A1 * | 7/2017 | Kawana | G02B 27/0101 |
| 2017/0219818 | A1 * | 8/2017 | Fang | G02B 5/3083 |
| 2017/0242248 | A1 * | 8/2017 | Kuzuhara | G02B 27/0101 |
| 2017/0307883 | A1 * | 10/2017 | Yamasaki | B60K 35/50 |
| 2017/0315351 | A1 * | 11/2017 | Yamazoe | B60K 35/60 |
| 2017/0363866 | A1 * | 12/2017 | Murzyn | B60K 35/50 |
| 2018/0017792 | A1 * | 1/2018 | Takazawa | B60K 35/60 |
| 2018/0172990 | A1 * | 6/2018 | Fujita | G02B 27/01 |
| 2018/0210201 | A1 * | 7/2018 | Togasaki | G02B 27/0101 |
| 2018/0341110 | A1 * | 11/2018 | Hirata | B60K 35/28 |
| 2018/0348515 | A1 * | 12/2018 | Kuzuhara | B60K 37/20 |
| 2018/0350236 | A1 * | 12/2018 | Yamaguchi | G02B 27/01 |
| 2019/0011712 | A1 | 1/2019 | Nagano et al. | |
| 2019/0033586 | A1 * | 1/2019 | Miyato | B60K 35/215 |
| 2019/0113672 | A1 * | 4/2019 | Sugiyama | G02F 1/133605 |
| 2019/0129172 | A1 * | 5/2019 | Misawa | G02B 27/0149 |
| 2019/0212560 | A1 * | 7/2019 | Sugiyama | H04N 19/96 |
| 2019/0235240 | A1 * | 8/2019 | Nagano | G02B 27/0101 |
| 2019/0265468 | A1 * | 8/2019 | Hirata | B60K 35/215 |
| 2019/0265472 | A1 * | 8/2019 | Sugiyama | B60K 35/00 |
| 2019/0346676 | A1 * | 11/2019 | Hirata | G03B 21/14 |
| 2020/0073121 | A1 * | 3/2020 | Banyay | B60K 35/60 |
| 2020/0353816 | A1 * | 11/2020 | Hirata | G06F 3/013 |
| 2021/0263314 | A1 * | 8/2021 | Anzai | B60K 35/00 |
| 2022/0075189 | A1 * | 3/2022 | Hirata | G09G 3/002 |
| 2022/0082826 | A1 * | 3/2022 | Hirata | G02B 27/0101 |
| 2022/0219538 | A1 * | 7/2022 | Hirata | B60K 35/28 |
| 2022/0291545 | A1 * | 9/2022 | Hirata | G02F 1/13362 |
| 2022/0357644 | A1 * | 11/2022 | Hirata | G02B 27/28 |
| 2022/0365347 | A1 * | 11/2022 | Misawa | B60K 35/00 |
| 2023/0118314 | A1 * | 4/2023 | Hirata | B60K 35/29 345/1.3 |
| 2024/0069341 | A1 * | 2/2024 | Misawa | B60K 35/415 |

FOREIGN PATENT DOCUMENTS

| | | |
|---|---|---|
| KR | 10-2019-0020902 A | 3/2019 |
| WO | 2012/029916 A1 | 3/2012 |
| WO | 2013/080488 A1 | 6/2013 |
| WO | 2017/138242 A1 | 8/2017 |
| WO | 2019/044732 A1 | 3/2019 |

OTHER PUBLICATIONS

Hatanaka, Y. and Kanamori, N., "Head up Display for Automotive Visibility and Trend", Denso Technical Review, vol. 21, 2016, pp. 109-112 (with English Abstract).

\* cited by examiner (a)

PHENOMENA OF SHIFTING AND DOUBLING IMAGE OF LIGHT ENTERING ONE EYEBALL
(IMAGE SHIFTS SINCE LIGHT PASSING PUPIL
FORMES IMAGE AT A DIFFERENT POSITION ON RETINA)

(b)

(a)

(b)

(a)

(b)

(a)

(b)

(a)

(b)

(a)

(b)

LIGHT SOURCE APPARATUS, AND INFORMATION DISPLAY SYSTEM AND HEAD-UP DISPLAY APPARATUS USING THE SAME

CROSS-REFERENCE TO RELATED APPLICATIONS

The present application is based on PCT filing PCT/JP2020/038053, filed Oct. 7, 2020, which claims priority to JP 2019-191685, filed Oct. 21, 2019, and JP 2020-090189, filed May 25, 2020, the entire contents of each are incorporated herein by reference.

TECHNICAL FIELD

The present invention relates to a light source apparatus, and an information display system and a head-up display apparatus using the same.

BACKGROUND ART

As an in-vehicle information display system, there is known a head up display (HUD) as described in Non-Patent Document 1 in which a virtual image in a real view monitored by the driver during driving is formed from an image projected on an image display apparatus by an action of a concave mirror and is reflected by a window glass to provide an enlarged image to a driver.

The first problem of the HUD is that the virtual image is a double image in appearance since two surfaces of the window glass, that are a vehicle interior surface (described as an inner surface) and a vehicle exterior surface (described as an outer surface), serve as reflection surfaces. In addition, the second problem is that the volume of the set is large, and the set of an AR (Augmented Reality)-HUD that obtains a large virtual image at a long distance cannot be arranged in a space between the steering wheel and the window glass because of having a volume exceeding 10 liters. Furthermore, since the HUD cannot be easily replaced if malfunction occurs, the flexibility of maintenance is low, etc., and is an obstacle to widespread use. In addition, the maximum value of the resolution of the display image in the existing system is about 80 dots per viewing angle of 1 degree, and causes the hardware configuration that is difficult to respond to the advancement of the communication environment since, for example, high-precision image display cannot be performed. In order to solve the first problem described above, there has been proposed a technical means for solving this problem by providing an interlayer film whose film thickness varies in a wedge-like shape in the vertical direction on a windshield, as described in Patent Document 1.

RELATED ART DOCUMENTS

Patent Document

Patent Document 1: International Patent Publication WO 2012/029916

Non-Patent Document

Non-Patent Document 1: DENSO TECHNICAL REVIEW Vol. 21, 2016

SUMMARY OF THE INVENTION

Problems to be Solved by the Invention

However, in the above-described projection-type information display systems and apparatuses of the related art, consideration is not given to improvement of a light utilization efficiency by effectively transmitting the image light to an observer in a vehicle, and thus, not given to reduction in the power consumption of the apparatus including the light source and others. In addition, consideration is not given to a countermeasure against damages of a liquid crystal panel that is the image display apparatus due to entry of sunlight to the HUD apparatus. Furthermore, there is no description about reduction in the HUD set volume, simply-detachable configuration and arrangement, and increase in the resolution of the resultant image.

Therefore, the present invention provides, as an image display system, a technique capable of displaying a suitable image in the inside of the space (the vehicle interior).

Means for Solving the Problems

In order to solve the above-described problems, for example, the configuration described in CLAIMS is adopted. The present invention includes a plurality of means for solving the above-described problems, and one example thereof includes: a point or planar light source; an optical means configured to reduce a divergence angle of light output from the light source; and a light guide configured to have a reflection surface that reflects the light output from the light source and propagates the light to an image display apparatus. The light guide includes a surface facing the image display apparatus, the reflection surface of the light guide reflects a light flux output from the light source toward the image display apparatus facing the light guide, a reflection type polarizing plate is arranged between the image display apparatus and the light guide between the image display apparatus and the reflection surface, light having a specific polarization direction reflected by the reflection type polarizing plate is transmitted through the reflection surface of the light guide and a portion connecting the reflection surface and is reflected by a reflection surface in parallel with a waveplate, the reflection surface being provided on an opposite surface of the light guide close to the image display apparatus, the polarization direction of the light having the specific polarization direction is converted to propagate as light having a polarization direction different from the specific polarization direction to the image display apparatus by bringing the light having the specific polarization direction to pass through the waveplate twice, and a part of the divergence angle of the light entering the image display apparatus from the light source is controlled by a shape and surface roughness of the reflection surface.

As a result, a thin high-luminance direct-view image display apparatus that outputs a specific polarized wave can be achieved, and the image is reflected by the window glass to directly supply image information to the driver. A retardation plate ($\lambda/2$) is provided in the interlayer film provided in the window glass in order to reduce the double image generated in the window glass and the damages on the image display apparatus (liquid crystal panel) due to the sunlight entering from the outside of the vehicle.

Effects of the Invention

According to the present invention, it is possible to suitably display the image in the vehicle. Problems, configurations, and effects other than those described above will be clarified by the following description of embodiments.

BRIEF DESCRIPTIONS OF THE DRAWINGS

Figure 6:
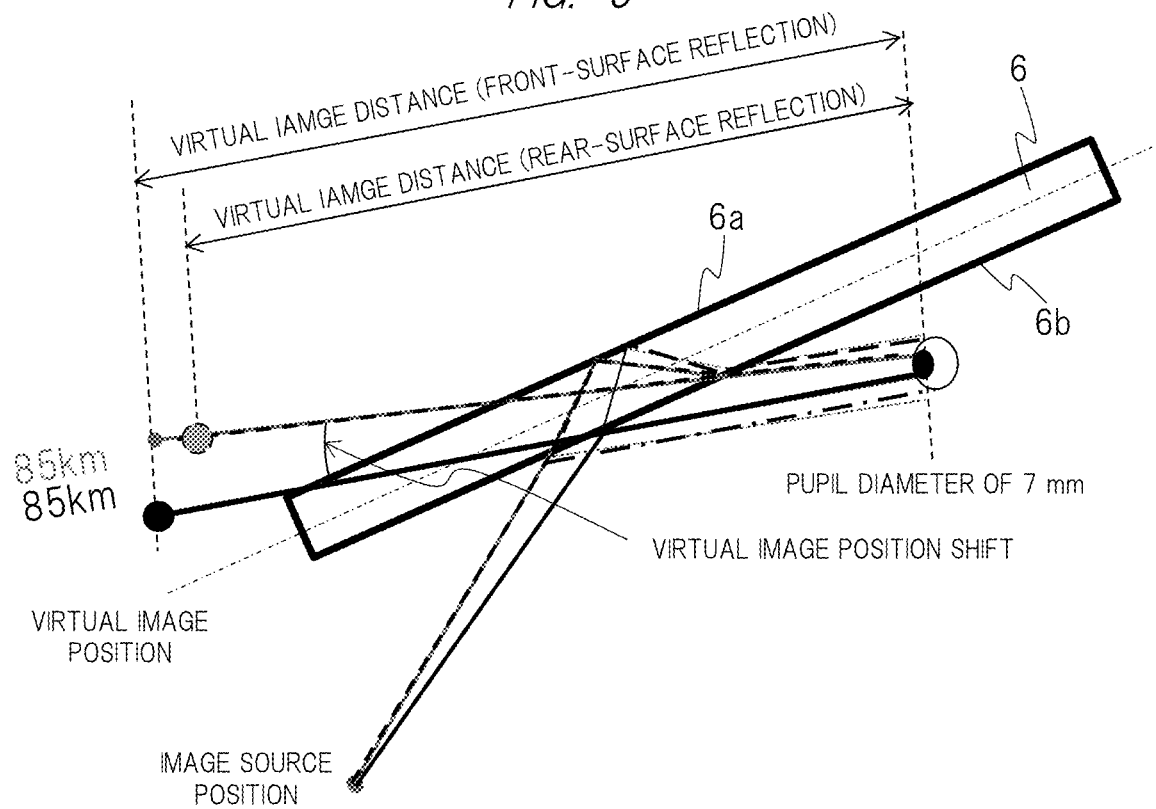
Figure 7:
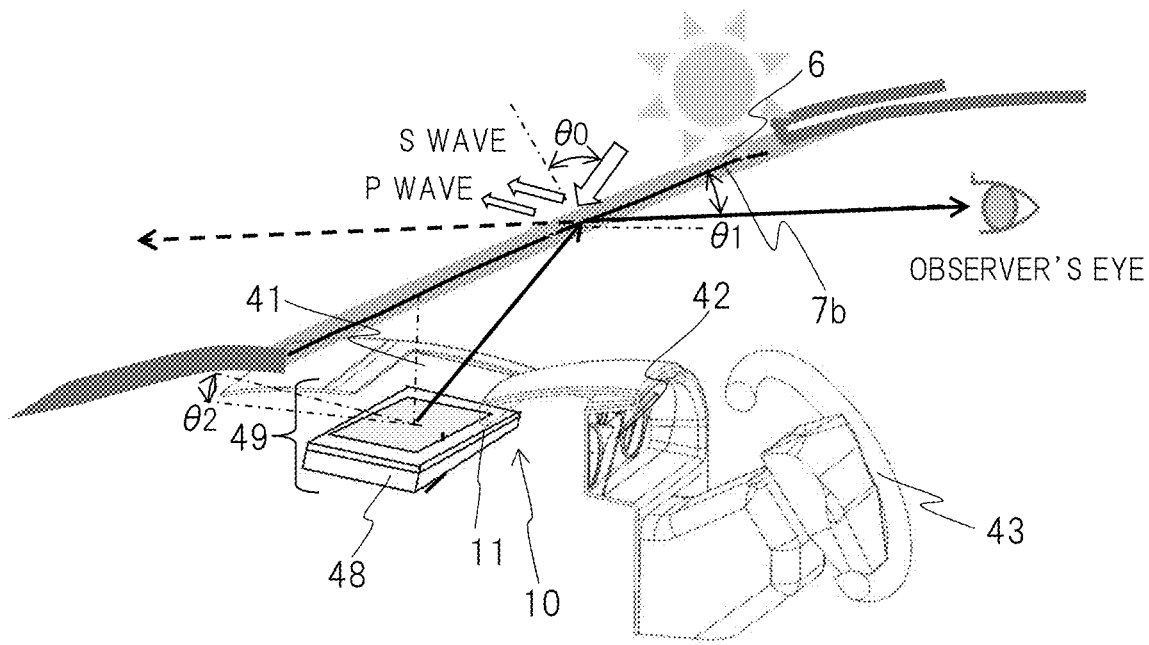
Figure 8:
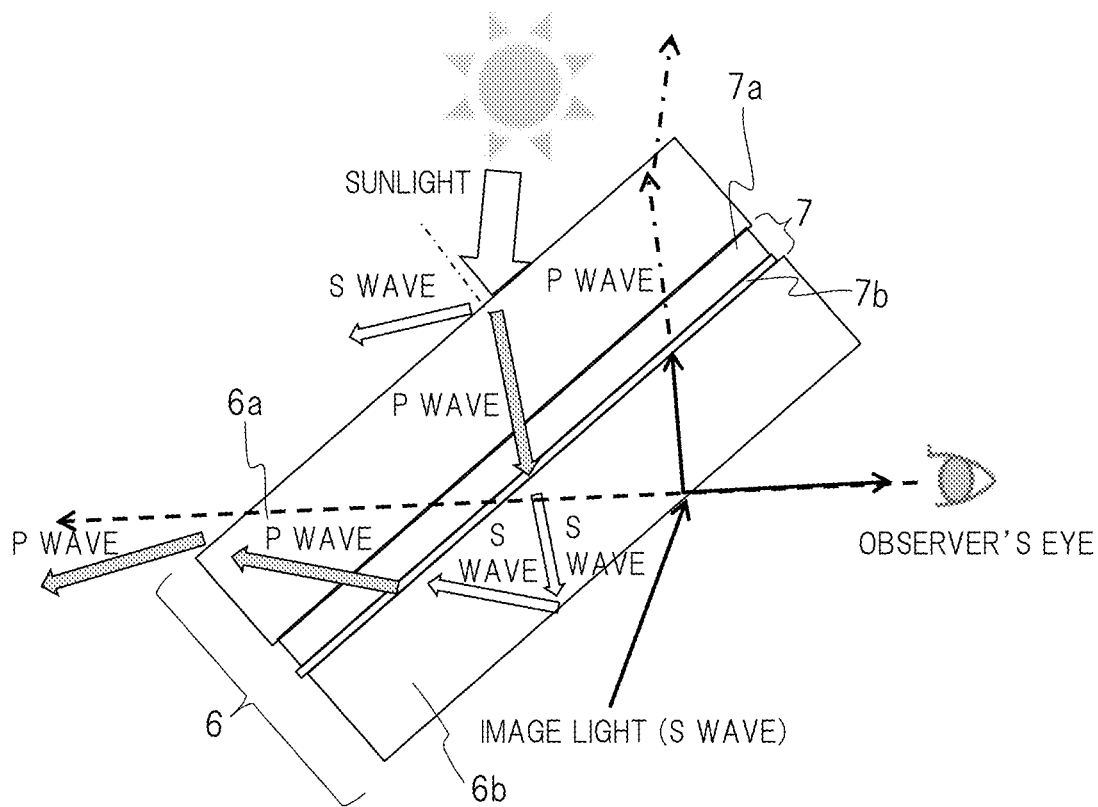
Figure 9:
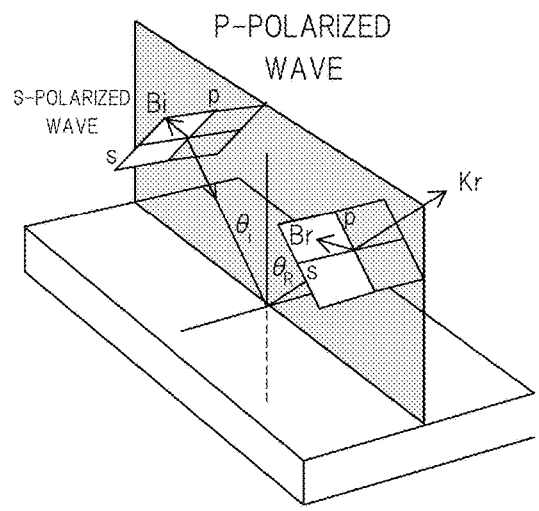
Figure 9:
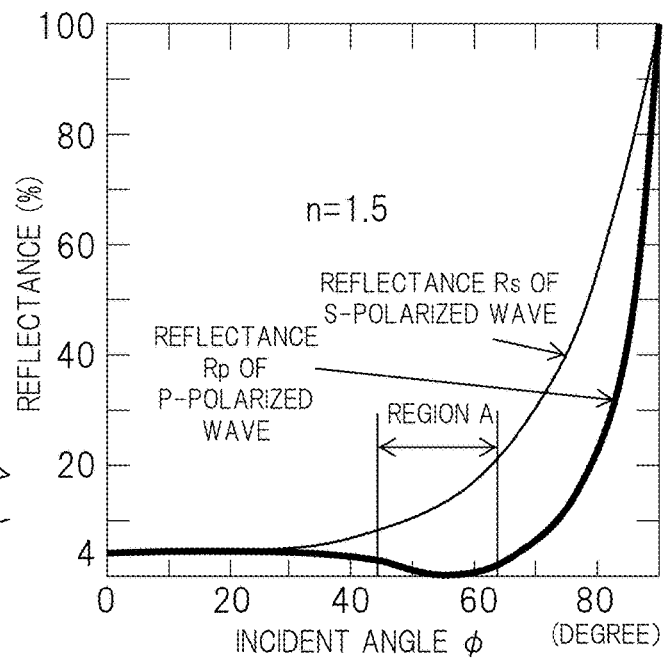
Figure 10:
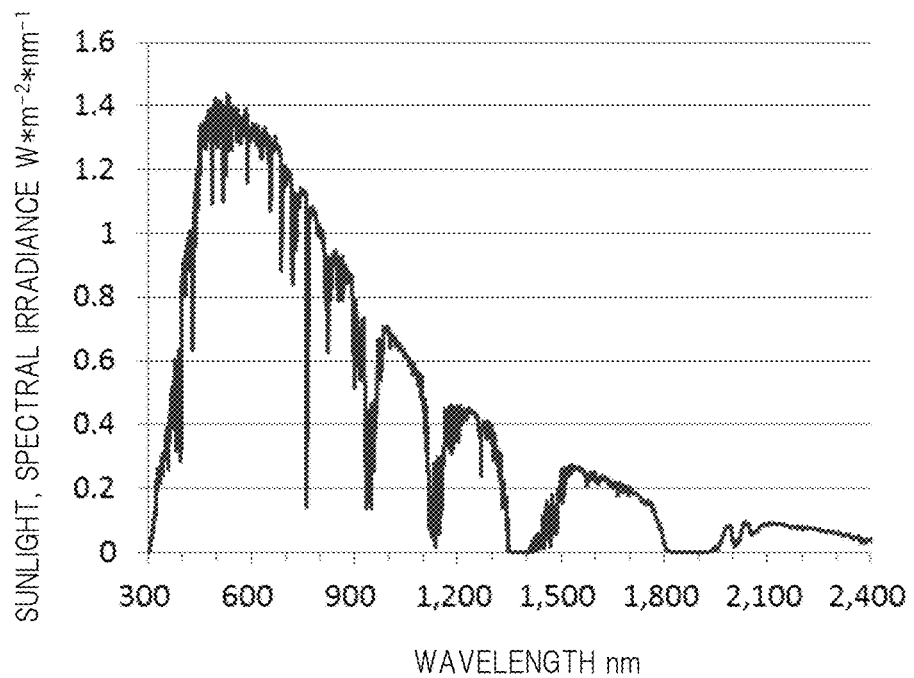
Figure 11:
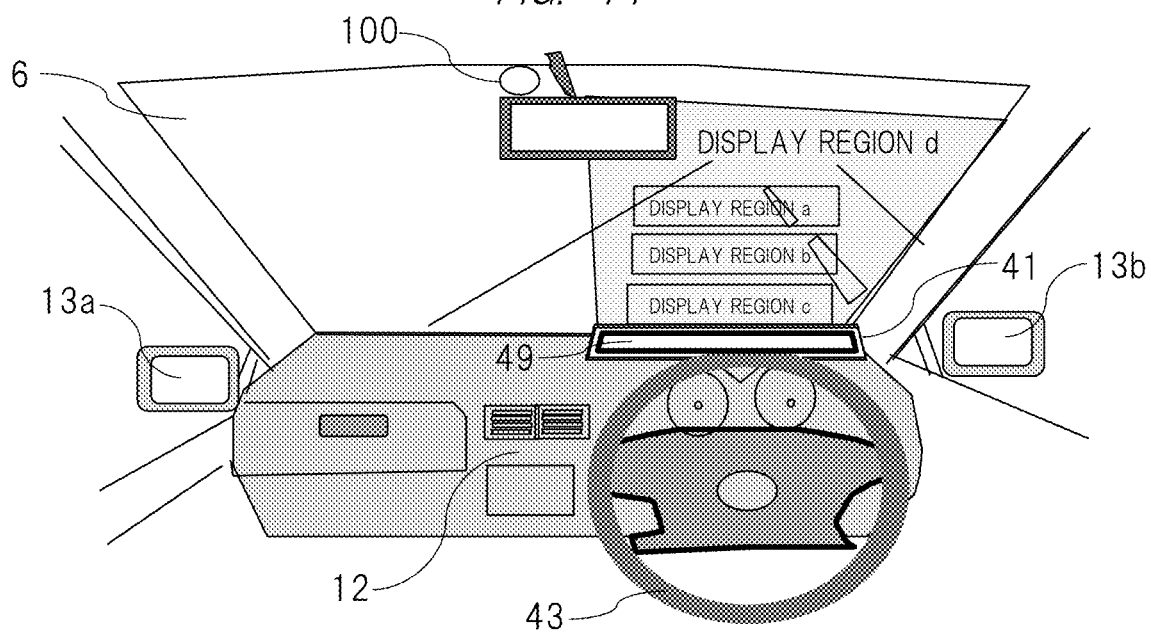
Figure 12:
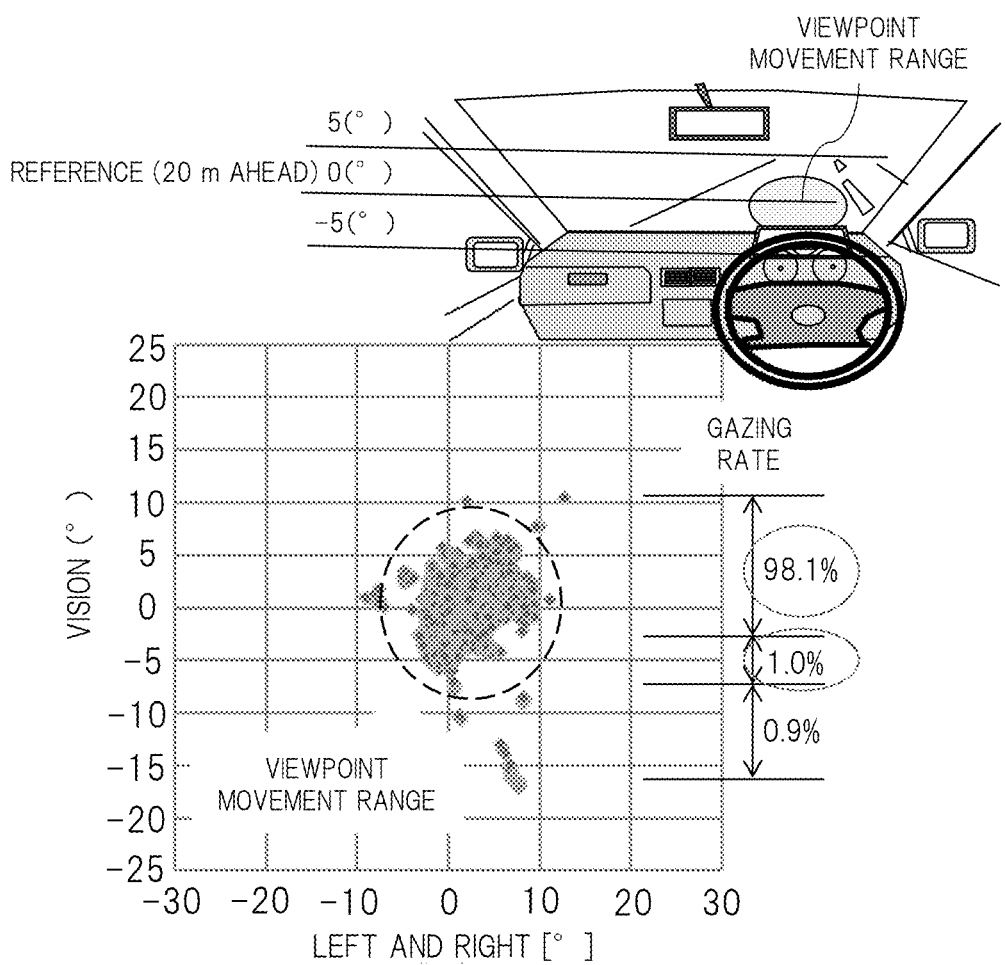
Figure 13:
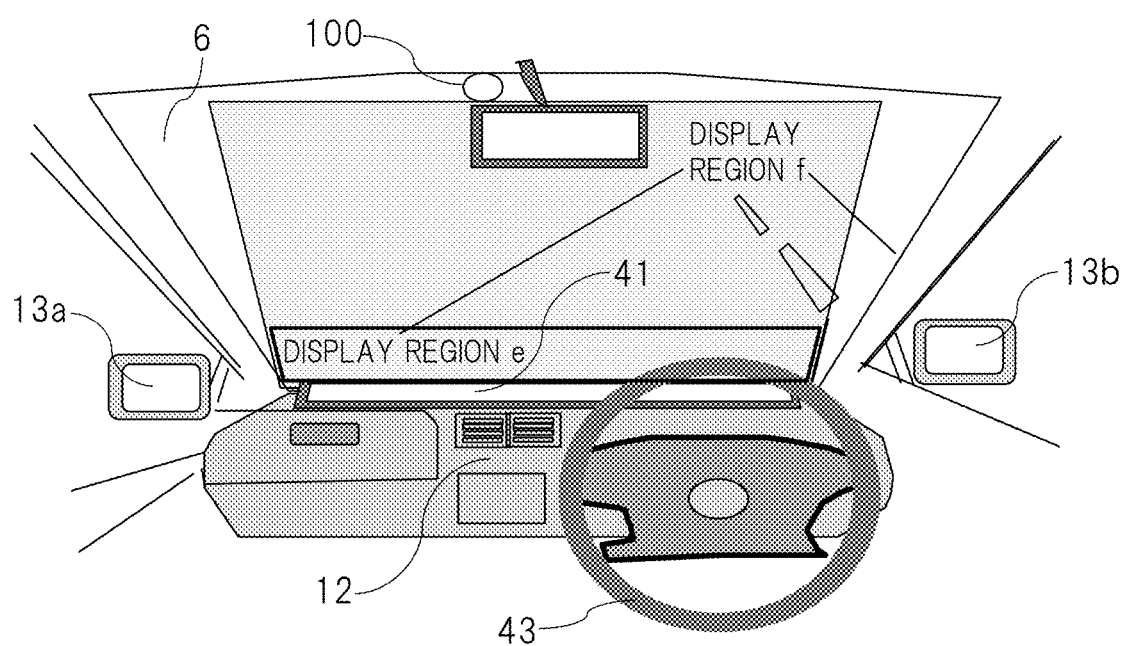
Figure 14:
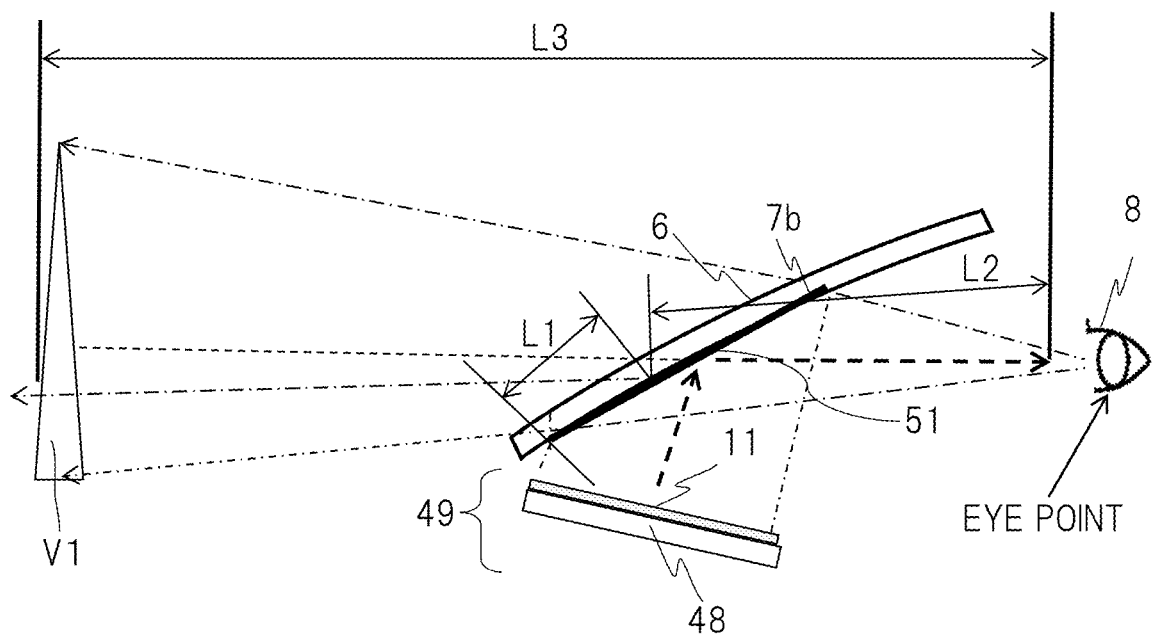
Figure 15:
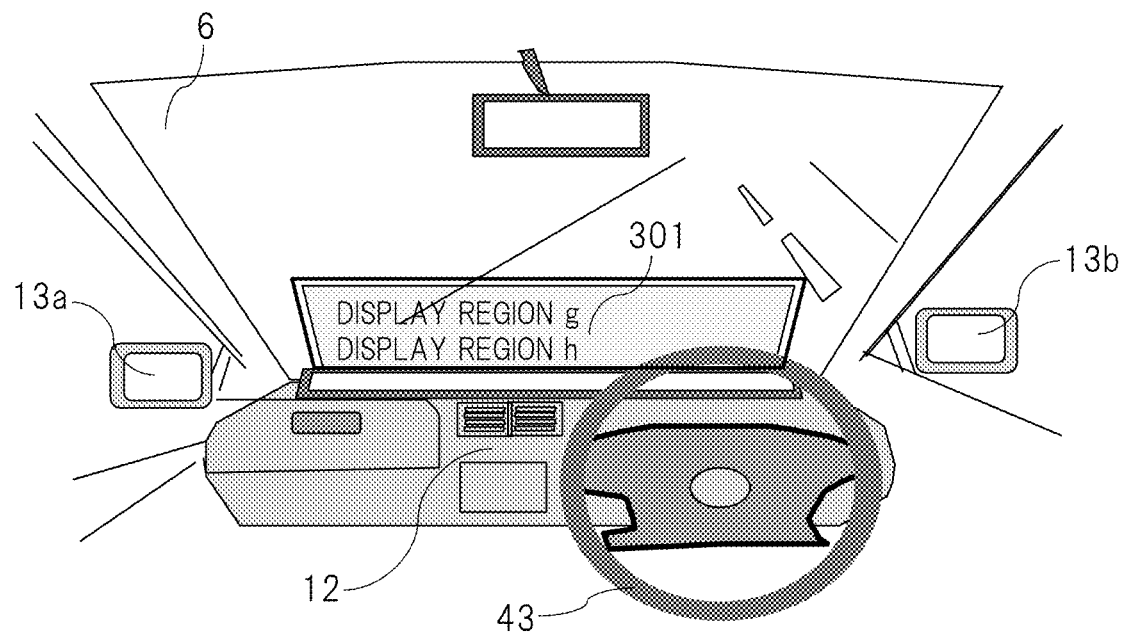
Figure 16:
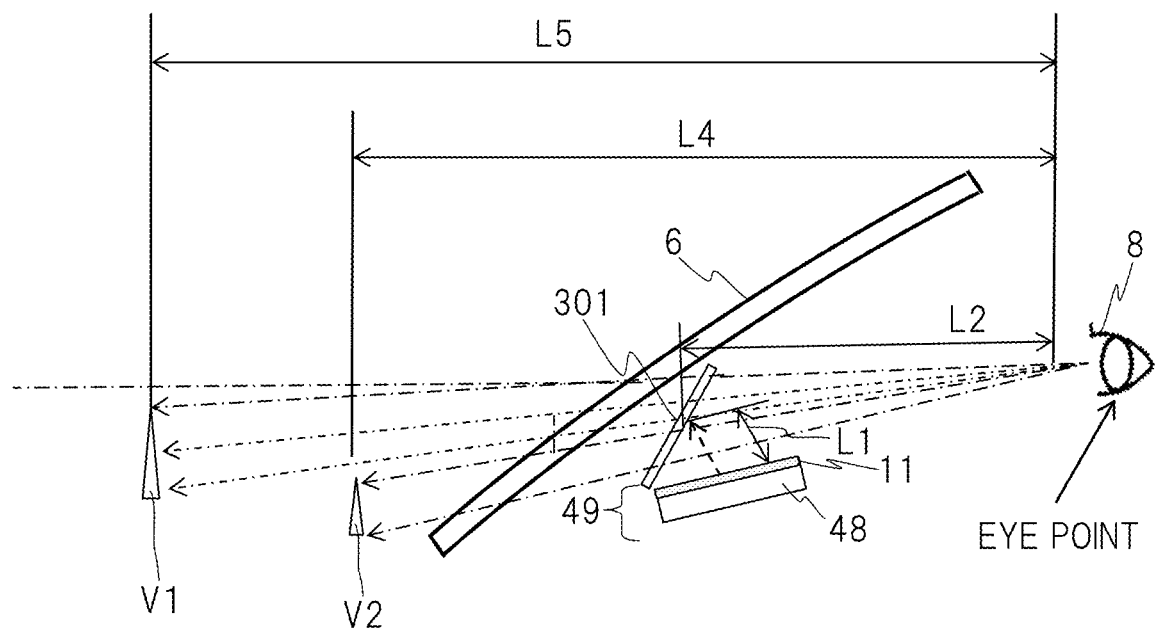
Figure 17:
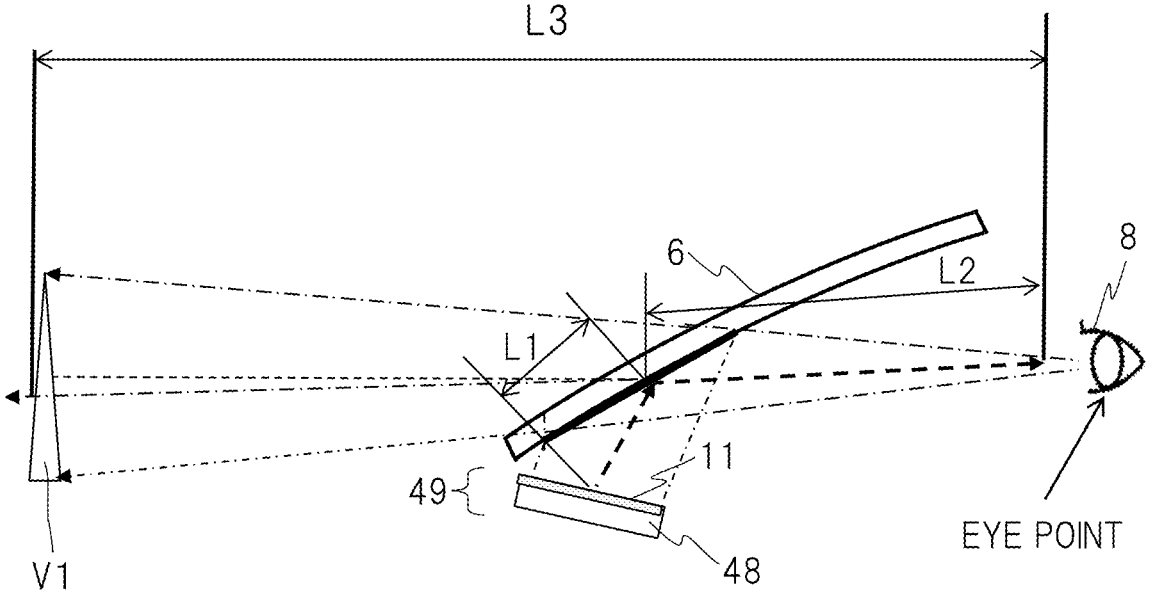
Figure 18:
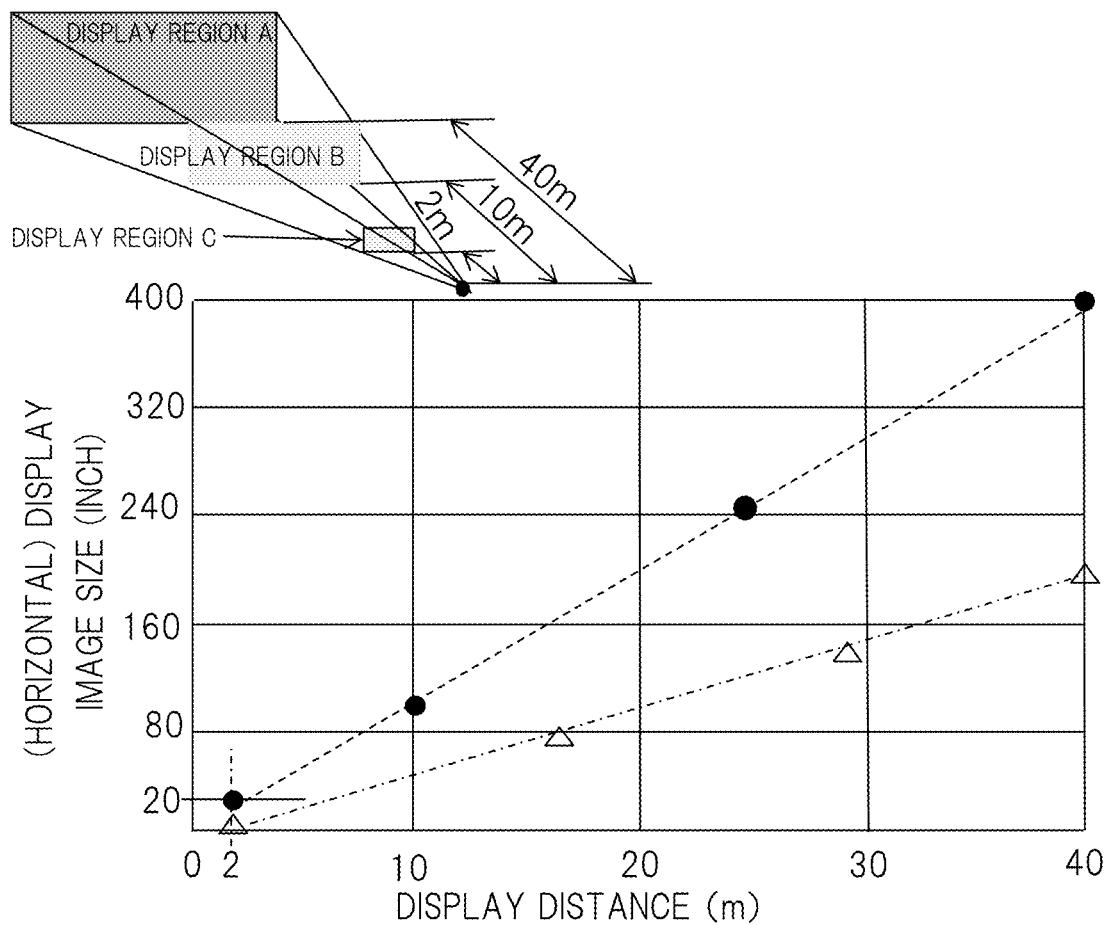
Figure 19:
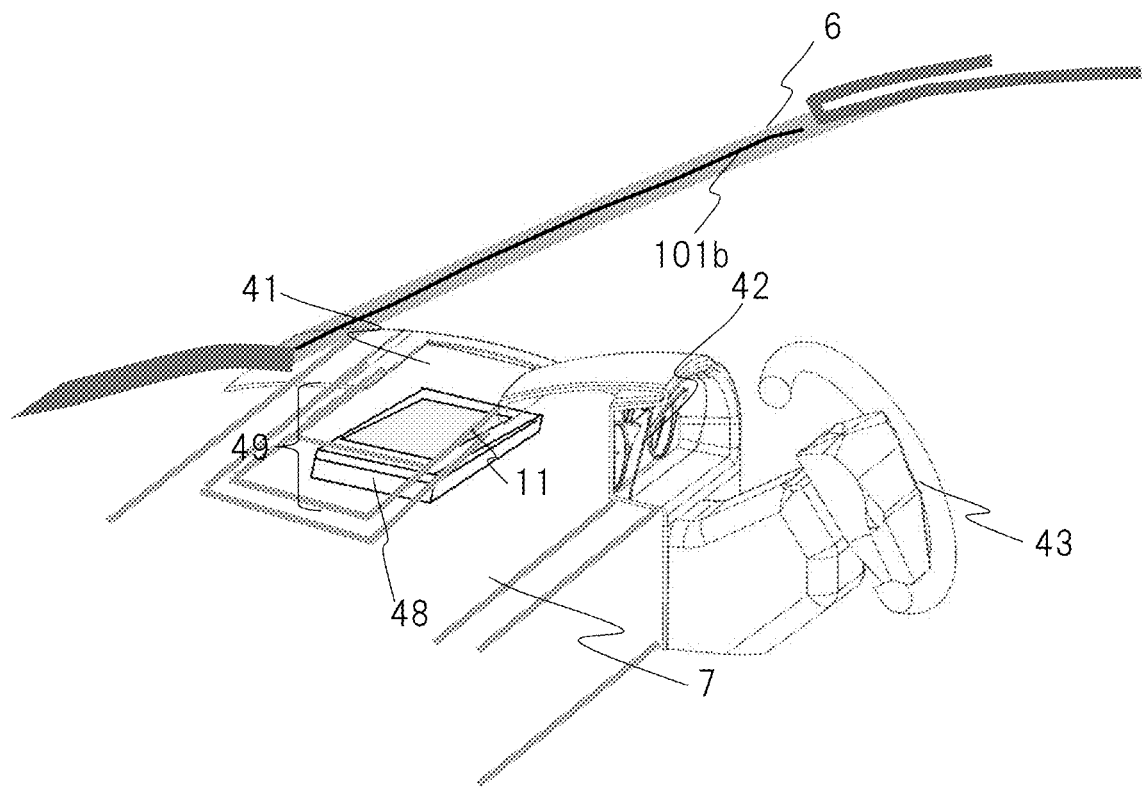
Figure 20:
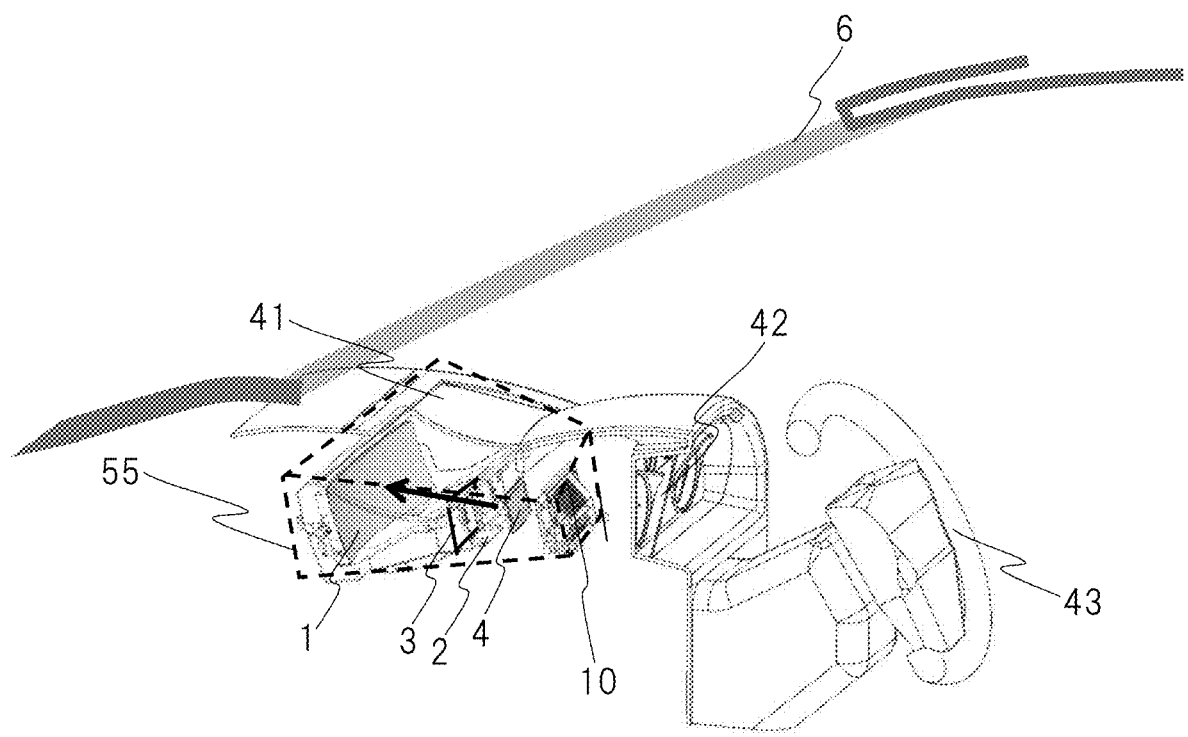
Figure 21:
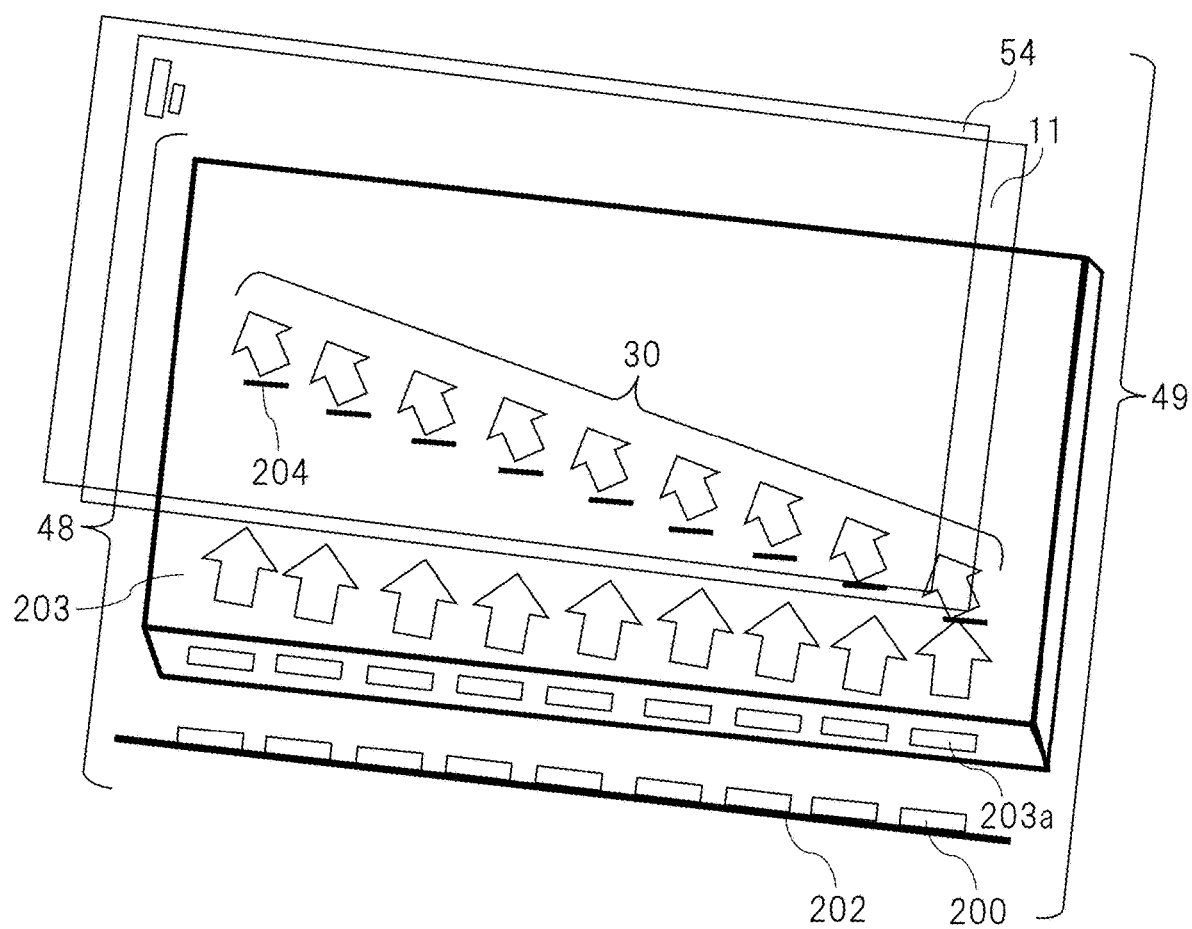
Figure 22:
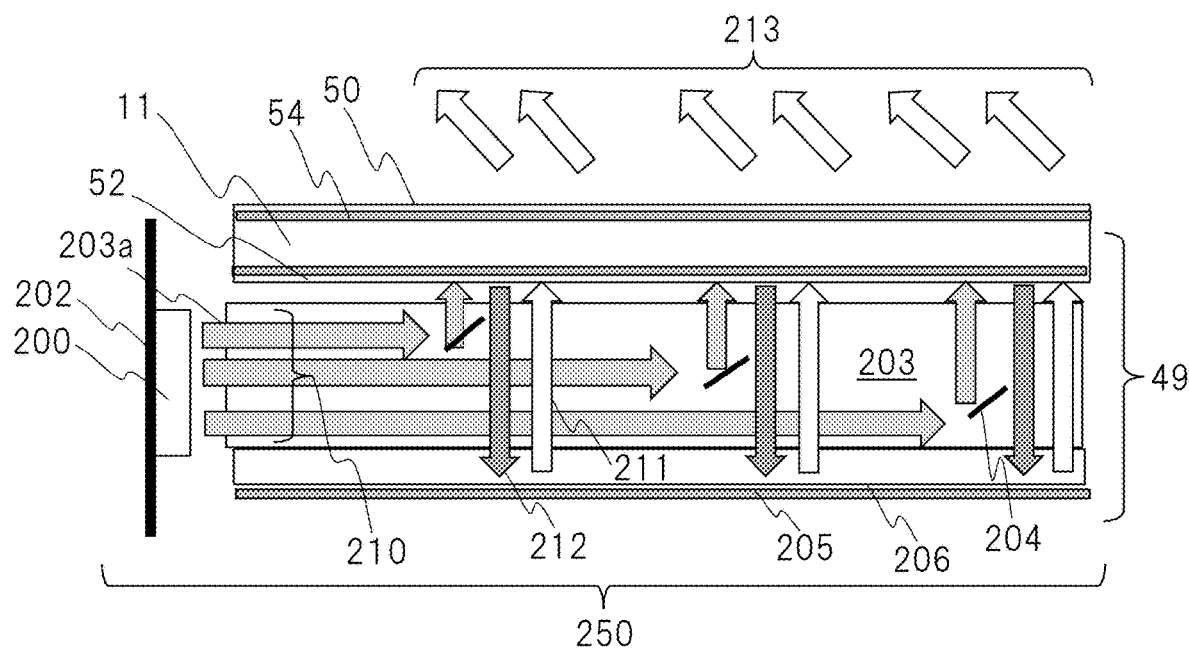
Figure 23:
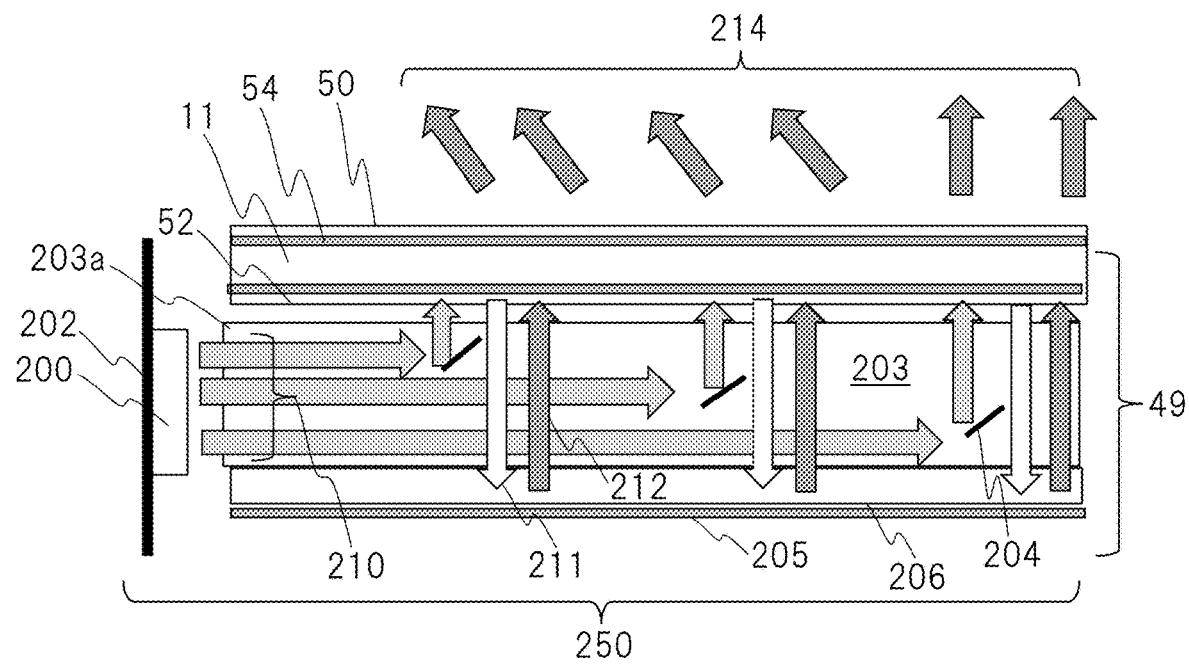
Figure 26:
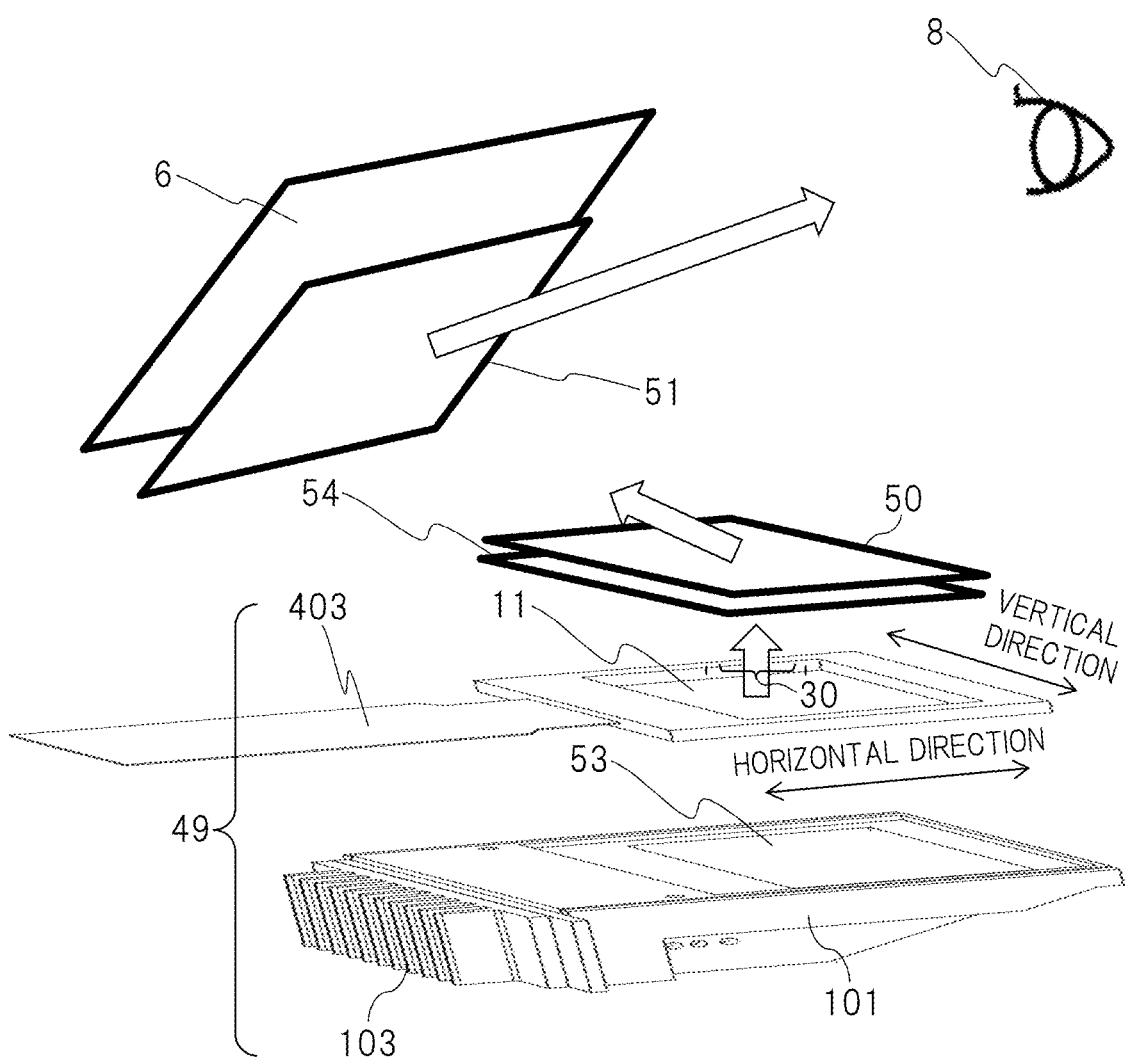
Figure 27:
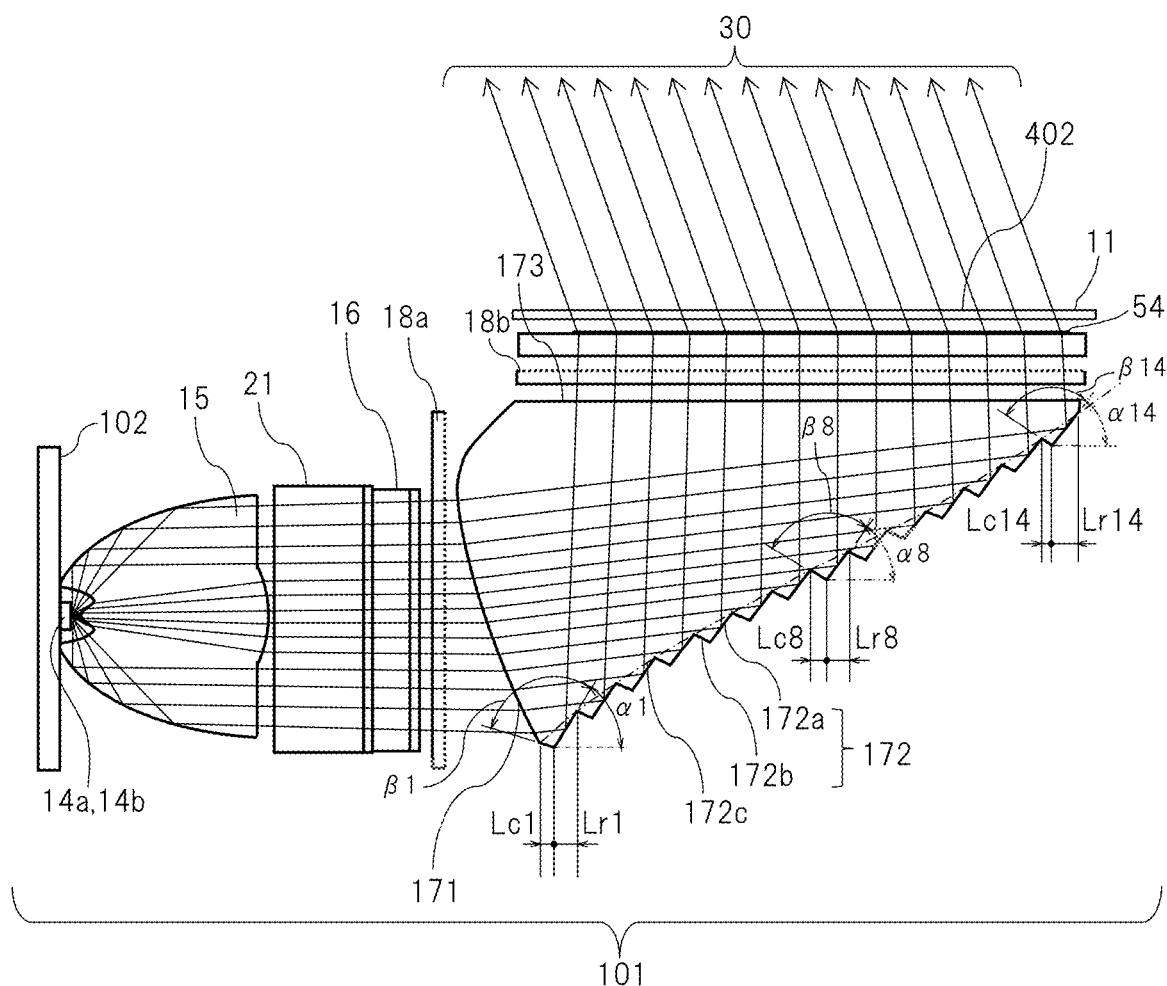
Figure 30:
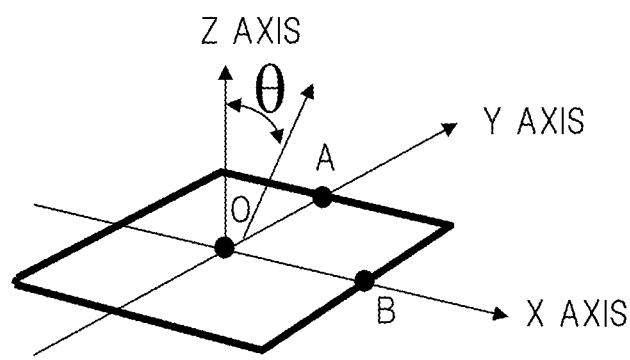
Figure 30:
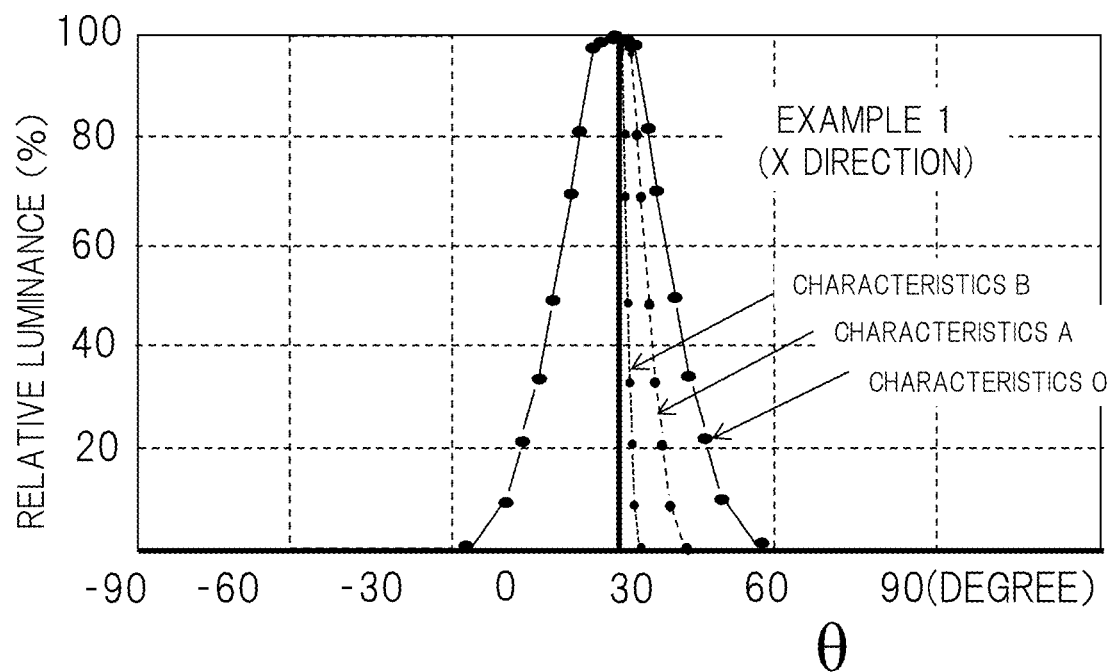
Figure 31:
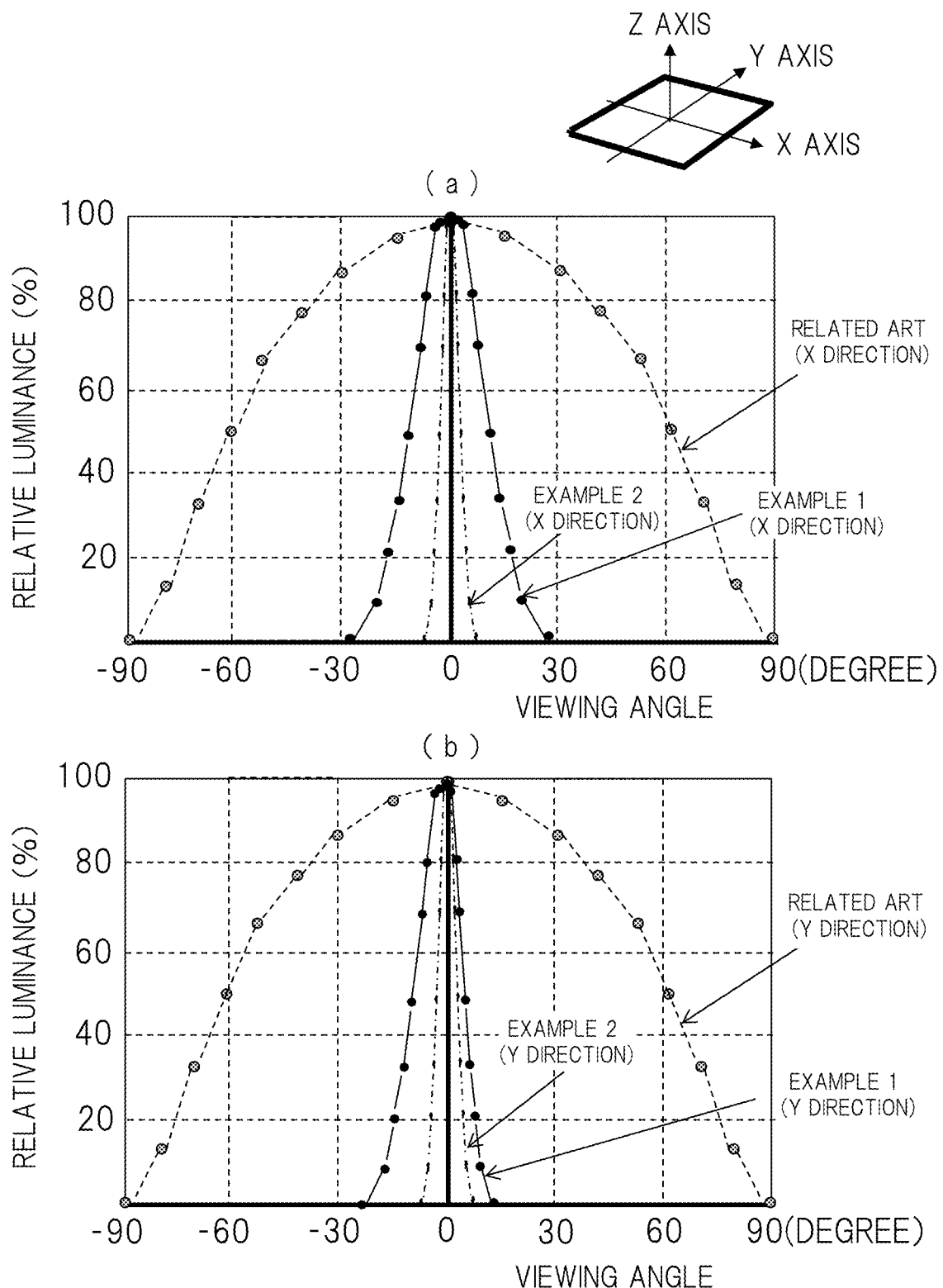

FIGS. 5(a) and 5(b) are schematic diagrams for explaining a phenomenon in which images of light entering one eyeball are displaced to form the double image;

FIG. 6 is a schematic diagram for explaining a mechanism in which the double image is generated by the windshield;

FIG. 7 is a schematic configuration diagram illustrating an embodiment of a long-distance display optical system of the information display system;

FIG. 8 is a cross-sectional view for explaining the principle of the present application for blocking sunlight to reduce the double image;

FIG. 9 is a view illustrating a reflectance on a glass to P-polarized light and S-polarized light of natural light such as sunlight at an incident angle;

FIG. 10 is a view illustrating wavelength distribution of natural light such as sunlight;

FIG. 11 is an explanatory diagram for explaining an image position displayed on the windshield by the image display apparatus according to the embodiment;

FIG. 12 is a characteristic diagram summarizing experimental results for obtaining a range of viewpoint movement when a driver gazes frontward during driving;

FIG. 13 is an explanatory diagram for explaining the image position displayed on the windshield by the image display apparatus according to the embodiment;

FIG. 14 is a diagram illustrating an example of a specific configuration of the image display apparatus;

FIG. 15 is an explanatory diagram for explaining the image position displayed on the windshield by the image display apparatus according to the embodiment;

FIG. 16 is a view illustrating an example of the specific configuration of the image display apparatus;

FIG. 17 is a view illustrating an example of the specific configuration of the image display apparatus;

FIG. 18 is a view illustrating a relation between an image display position and an image size relative to a real view monitored by the driver according to the embodiment;

FIG. 19 is a schematic configuration diagram for explaining arrangement where the image display apparatus of the embodiment is installed to an automobile;

FIG. 20 is a schematic configuration diagram illustrating arrangement where a related-art image display apparatus is installed to an automobile;

FIG. 21 is a view illustrating an example of the specific configuration of the image display apparatus;

FIG. 22 is a cross-sectional view illustrating an example of a specific configuration of a light source apparatus;

FIG. 23 is a cross-sectional view illustrating an example of the specific configuration of the light source apparatus;

FIGS. 24(a) and 24(b) are cross-sectional views illustrating an example of the specific configuration of the image display apparatus;

FIGS. 25(a) and 25(b) are cross-sectional views illustrating an example of the specific configuration of the image display apparatus;

FIG. 26 is a view illustrating another example of the specific configuration of the image display apparatus;

FIG. 27 is a view illustrating an example of the specific configuration of a light source apparatus;

FIGS. 28(a) and 28(b) are views illustrating an example of the specific configuration of the light source apparatus;

FIGS. 29(a) and 29(b) are views illustrating an example of the specific configuration of the light source apparatus;

FIGS. 30(a) and 30(b) are views illustrating dispersion characteristics of image light of the image display apparatus; and FIG. 31 is a view illustrating the dispersion characteristics of the image light of the image display apparatus.

DETAILED DESCRIPTION OF PREFERRED EMBODIMENTS

The following embodiments relate to, for example, an information display system capable of transmitting an image of image light from a large-area image light emitting source through a transparent member partitioning a space such as a show window glass, and displaying the image onto outside a store (space). In addition, the following embodiments relate to an in-vehicle information display system that projects an image to the vehicle interior through a windshield, a rear glass, a side glass, and a combiner of an automobile or a train (hereinafter, collectively referred to as a "vehicle") using such an information display system.

According to the following embodiments, for example, it is possible to provide a novel and highly usable information display system that can display high-resolution image information on the glass surface of the show window, the rear glass of the vehicle, the windshield of the same, the side glass of the same, even the combiner of the same proposed in an embodiment, or the like, and can significantly reduce the power consumption of the apparatus including the light source by effectively transmitting the image light to the observer to improve the light utilization efficiency by reducing the divergence angle of the emitted image light, that is, by causing the divergence angle to be an acute angle, and further, unifying the image light into a specific polarized wave. In addition, for example, it is possible to provide an in-vehicle information display system that achieves in-vehicle visual recognition, that is so-called unidirectional display, through a shield glass such as a windshield, a rear glass and a side glass, that can reduce a double image generated on both sides of a window glass, and that has a sufficient protective function against sunlight.

As a general existing in-vehicle information display system that displays image information of a real image toward the vehicle interior, there is a system that lights up light emitting diode (LED) chips for display in accordance with the image information, the light emitting diode chips being arranged in a matrix. In such a system, (1) high power is required to obtain desired brightness because a dispersion angle of the LED chip is wide. In addition, (2) each of LED chips that obtain the desired brightness has a large size, and thus a high resolution cannot be obtained from an in-vehicle installable-size information display system. Furthermore, (3) preventing an increased apparatus size makes difficult to achieve color display of the image.

Meanwhile, a large concave mirror is required in order to provide an image display apparatus that can display a virtual image enlarged by a concave mirror at a long distance or in a wide range using a large liquid crystal panel achieving the color display, and therefore, the set size becomes large in order to secure an optical path from the image display apparatus to the concave mirror. Then, for example, the information processing apparatus cannot be housed in a space between a windshield 6 and a steering wheel 43 illustrated in FIG. 2 or the like. In addition, widening the range of the visually-recognizing space (eye box) including both eyes of the driver and the horizontal and vertical components of the angle formed by the line segment connecting the both eyes and the virtual image requires further increase of the size of the concave mirror, and leads to the above-described increase of the set size.

On the other hand, the in-vehicle image display apparatus of the present application achieves high luminance by using a high-resolution liquid crystal panel and causing the divergence angle of the light source apparatus to be a narrow angle. Furthermore, S-polarized light having a high reflectance of image light obliquely entering the window glass or the combiner is used as image output in order to increase the light utilization efficiency.

Furthermore, the reflectance of the sunlight is increased to decrease the amount of the light entering the liquid crystal panel by arranging a filter that converts the polarization direction in the windshield or the combiner in order to avoid the sunlight to enter an image display panel 11 and a light flux direction conversion means 54 to cause the damages, the sunlight being collected through the concave mirror when the sun is at a specific angle as illustrated in FIG. 7.

In addition, the double image that is generated when the image light is reflected twice by the image reflection surface of the windshield 6 and the surface of the same in contact with the outside of the vehicle also can be significantly reduced by the action of the above-described filter.

Hereinafter, embodiments of the present invention will be described in detail with reference to the drawings and the like. Note that the present invention is not limited to the description of the embodiments, and various modifications and alterations can be made within the scope of the technical idea disclosed in the present specification by those skilled in the art. In all the drawings for describing the present invention, components having the same function are denoted by the same reference signs, and repetitive description thereof may be omitted.

<Information Display System>

Figure 1:
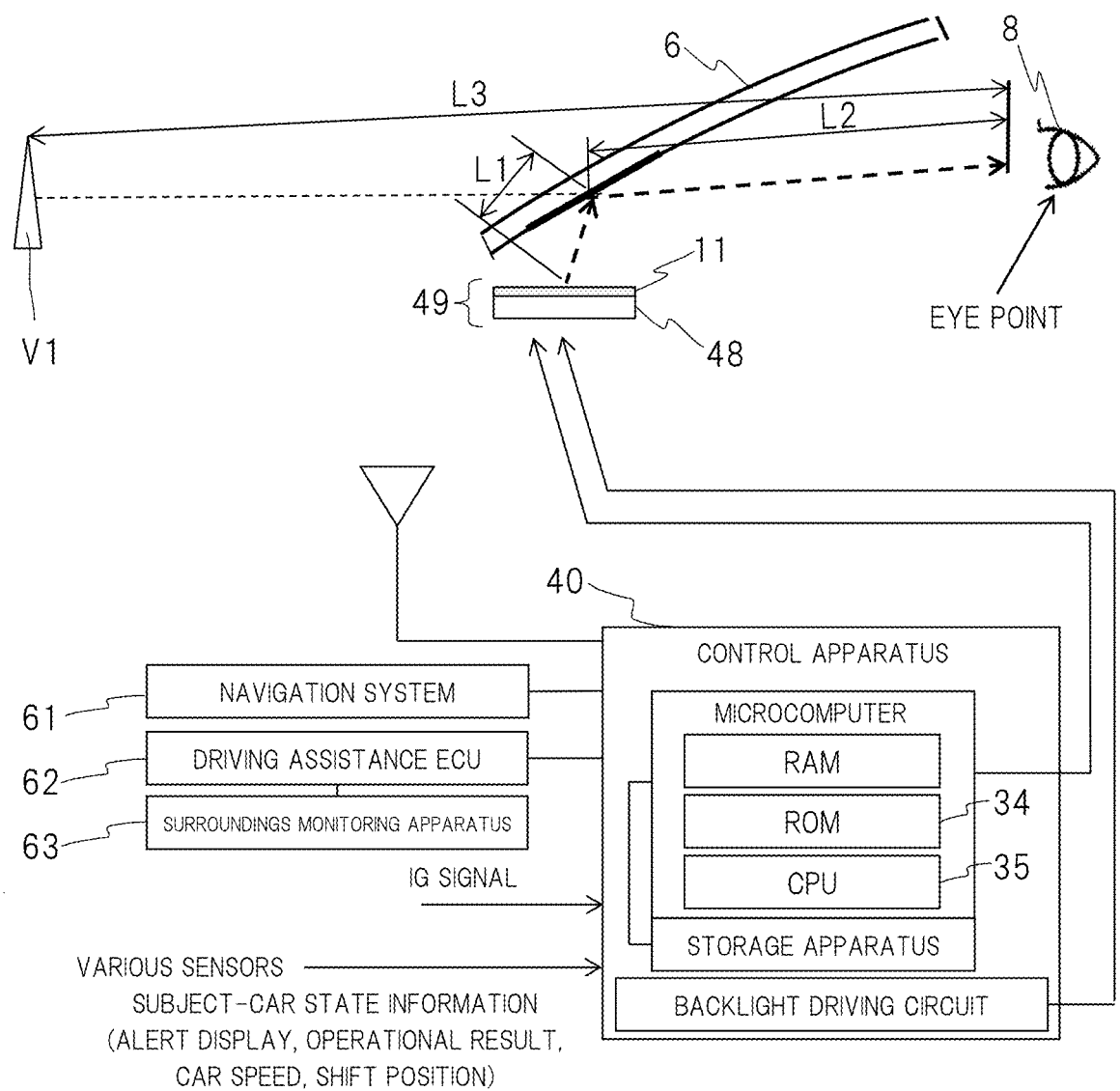
FIG. 1 is a schematic configuration diagram illustrating a peripheral apparatus configuration of an information display system according to an embodiment.

Next, FIG. 1 illustrates a more specific configuration of the information display system, and the image display panel 11 constituting an image display apparatus 49 is made of, for example, a relatively large liquid crystal display panel having a screen size exceeding 15 inches. The resolution of the panel is preferably 1280×720 dots or more to perform distortion correction at a level free from practical problems, and the resolution is preferably 1980×1080 dots or more to display a still image or a moving image of image information in addition to character information to the outside. Although not illustrated, it is also possible to achieve high resolution by combining a plurality of panels and using a blending function, and it is also possible to display different images on each image display apparatus.

In addition, the image display apparatus 49 includes a light source apparatus 48 constituting a light source together with the image display panel 11, and a configuration thereof is illustrated in FIG. 21. In FIG. 21, the light source apparatus 48 is illustrated as an exploded perspective view together with the image display panel 11. As indicated by an arrow 30, the liquid crystal display panel obtains an illumination light flux of plane emission having characteristics similar to those of laser light having narrow dispersion characteristics based on the light of the light source apparatus 48 serving as a backlight apparatus, that is, having strong directionality (straight propagation) and having a polarization plane unified in one direction, and emits the image light that is modulated in accordance with an input image signal, toward a transparent sheet 7b provided on the surface or inside of the window glass illustrated in FIG. 8.

In addition, in FIG. 21, the information display system includes the image display panel 11 constituting the image display apparatus 49 and the light source apparatus 48, and besides, the light flux direction conversion means 54 that controls the directionality of the emitted light flux from the light source apparatus 48, and a narrow angle dispersion plate (not illustrated) as necessary. Polarizing plates are provided on both surfaces of the image display panel 11, so that image light of a specific polarized wave is output while the light intensity is modulated in accordance with on the image signal (see the arrow 30 in FIG. 21). As a result, a desired image is projected as light of the specific polarized wave having high directionality (straight propagation) toward the windshield 6 through the light flux direction conversion means 54, and is reflected by the surface of the windshield 6 toward the eyes of the observer. An incident angle of the image light on the windshield 6 can be controlled by inclining the image display apparatus 49 with respect to the windshield 6 without providing the above-described light flux direction conversion means 54.

In the present embodiment, in order to improve the utilization efficiency of the emitted light flux from the light source apparatus 48 to significantly reduce the power consumption in the image display apparatus 49 including the light source apparatus 48 and the image display panel 11, high directionality is provided by an optical component such as a lenticular lens, a transparent panel or others to the luminance of the image light, which is the light (see the arrow 30 in FIG. 21) from the light source apparatus 48 and is transmitted through or dispersed on a transparent sheet 51 provided on the surface of the windshield 6. According to this, the image light from the image display apparatus 49 efficiently reaches the observer inside the windshield 6 because of having high directionality (straight propagation) as if the light was the laser light, and, as a result, can display a high-quality image with a high resolution and can remarkably reduce the power consumption in the image display apparatus 49 including LED elements 200 of the light source apparatus 48.

<In-Vehicle Information Display System>

In the image light that is generated from the image display apparatus 49 and is emitted toward the windshield 6 serving as the projection target member as illustrated in FIG. 1, the above-described embodiment can (1) display a high-quality image on the high-resolution image display panel 11 and improve the utilization efficiency of the emitted light to significantly reduce the power consumption by changing the dispersion light of the LED by using an optical system described below to the image light having the narrow dispersion angle (high straight propagation) and only containing a specific polarized wave component, as if the light was image light from an image source (light source apparatus 48) having an action as similar to a plane-emitting laser, and (2) form the entire outer shape of the apparatus to be a plane (panel) shape as clearly seen from the above-described components.

Therefore, it is possible to install the apparatus separately in a storage space provided on a part of the console of the vehicle body. Furthermore, since the image light from the image display apparatus 49 has narrow dispersion characteristics, a high-luminance image can be provided with low power consumption. At this time, the in-vehicle information display system requires a luminance of 40,000 (nt) or more when the image light is an S-polarized wave in order to cause the observer to visually recognize the image through the window glass in the daytime. On the other hand, the image display apparatus according to the present embodiment is not only for in-vehicle use but also can be used as a tablet terminal for outdoor use because of its high luminance. The necessary luminance at this time is about 2000 (nt) with the power consumption being about ½0, and thus it is possible to drive the image display apparatus for a long time with a small battery, wirelessly propagate information from an information processing apparatus such as a smartphone to display the information as an image, and select the information or selectively deeply make advance to the information through an interaction function.

FIG. 19 illustrates a state in which the image display apparatus 49 according to the embodiment of the present application is arranged in a console part of the vehicle body. As compared with a related-art image display apparatus 55 using a concave mirror 1 illustrated in FIG. 20, there is no space through which the image light passes, and therefore, a compact apparatus can be made.

It is not necessary to arrange the optical member in a space from the image display apparatus 49 to the windshield 6, and the space region through which the image light flux passes can be made unnecessary as compared with the conventional image display apparatus 55 using the concave mirror 1 illustrated in FIG. 20, and therefore, the compact apparatus can be made. Furthermore, when the entire surface of the image display screen of the image display apparatus is used, the apparatus is designed so that the image display can be performed on an entire region "d" of the windshield 6 facing the driver as illustrated in FIG. 11, and a display position such as a display region "a", a display region "b" and a display region "c" is moved or optimally selected in accordance with the vehicle speed and the viewpoint of the driver through a camera (not illustrated) that is provided in the vehicle to sense the viewpoint of the driver. Furthermore, a driving assistance system such that the displayed image does not interfere with the driving can be configured by providing a function to divide the display region into left and right portions across the center of the viewpoint and move or select the display position in accordance with the vehicle speed and the movement of the viewpoint.

In addition, a large amount of image information can be simultaneously displayed by displaying the image in all the image display regions in a stopping state.

Meanwhile, as an image to be displayed on the image display apparatus 49, navigation information, speed information from the driving assistant ECU, engine torque information, remaining power in an electric vehicle, remaining fuel information in a gasoline vehicle or a hybrid vehicle, and the like are displayed, in addition to monitoring information around the vehicle from the in-vehicle camera and alert information for calling attention. Furthermore, information from an information processing apparatus such as a smartphone also can be propagated in a wired or wireless manner and displayed as an image, and it is possible to select the information or selectively deeply make advance to the information through the interaction function. Various examples of the in-vehicle information display system in which the information display system of the present invention is applied to a vehicle such as an automobile, a train, or an aircraft using these features, or so-called the in-vehicle information display system, will be described in detail below.

Figure 2:
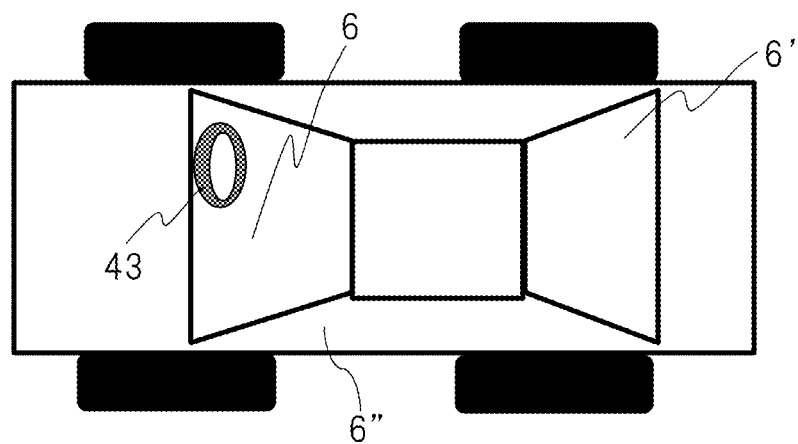
FIG. 2 is a top view of a vehicle on which the information display system is mounted.
Figure 3:
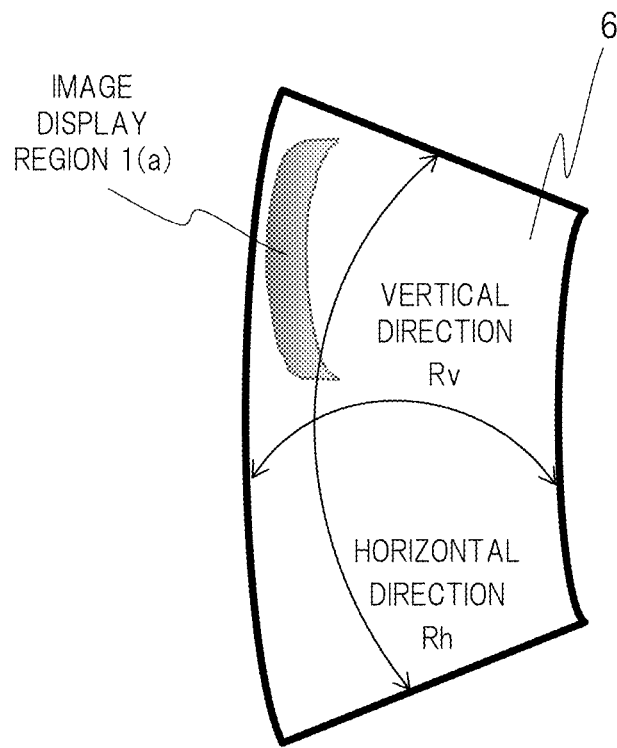
FIG. 3 is a view illustrating a difference in radius of curvature of a windshield.

FIGS. 2 and 3 illustrate an example in which the above-described image display apparatus 49 and the like are mounted on a commercial vehicle, and image information is displayed on a part of the windshield 6 (the upper portion of the steering wheel 43), a part of the side glass 6" or the like, or the whole thereof. FIGS. 2 and 3 illustrate an example of the image display region.

Figure 24:
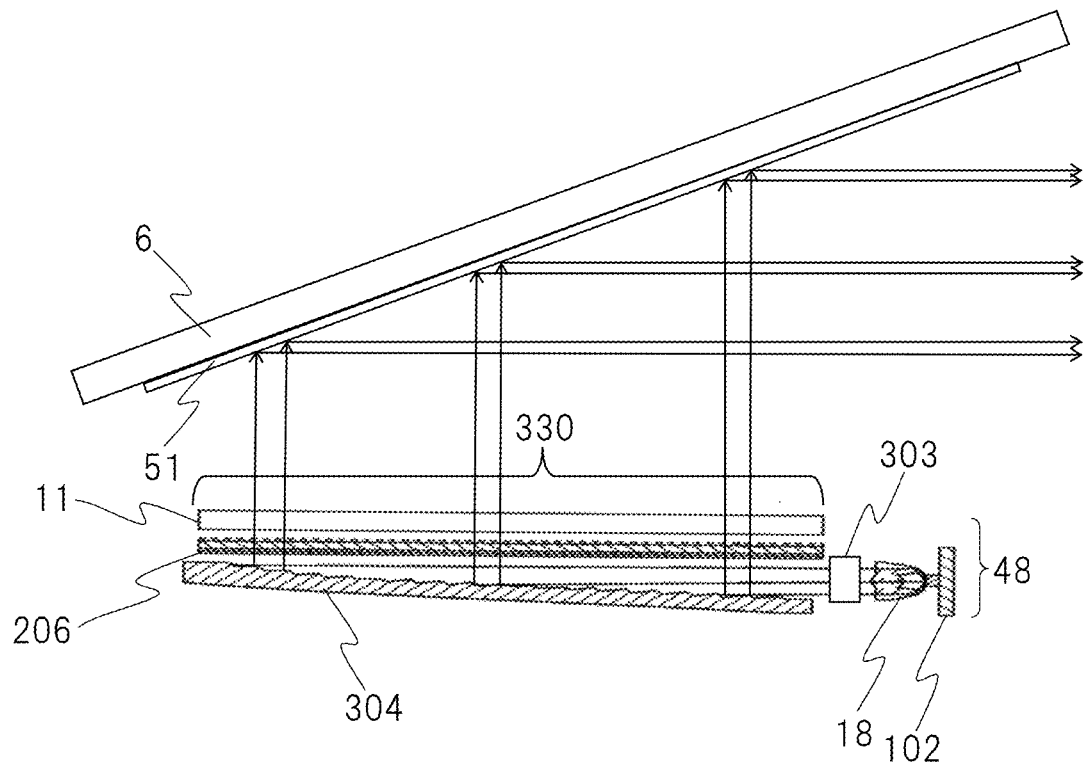
Figure 24:
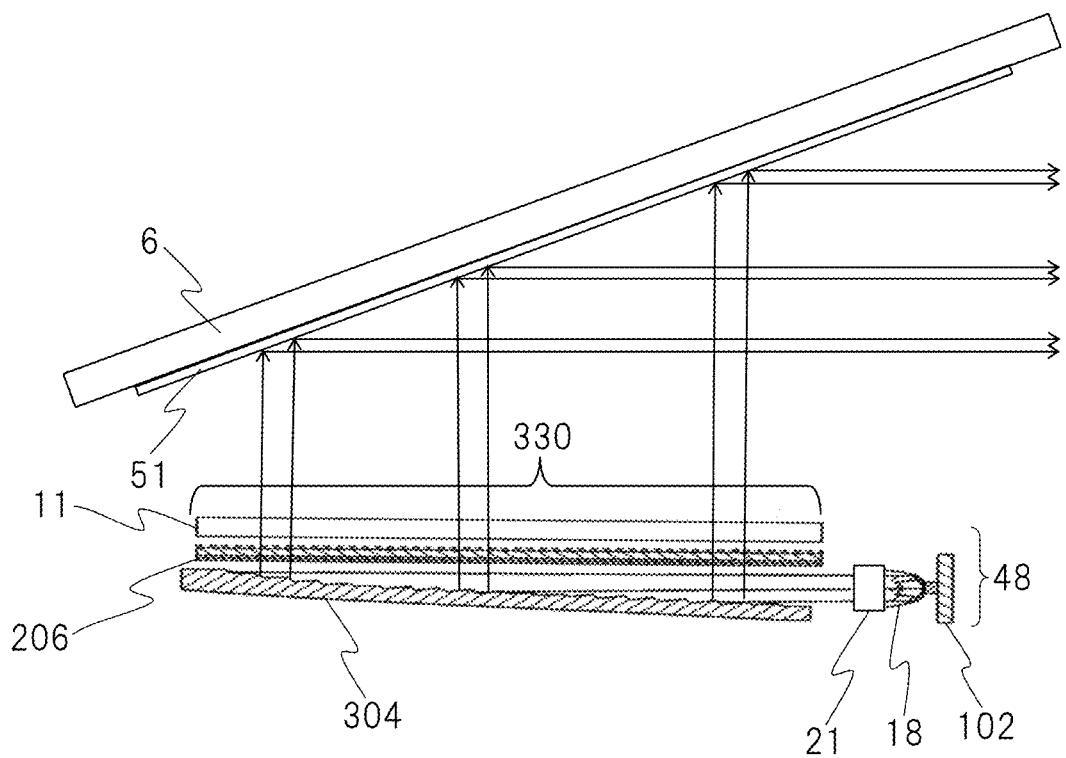
Figure 25:
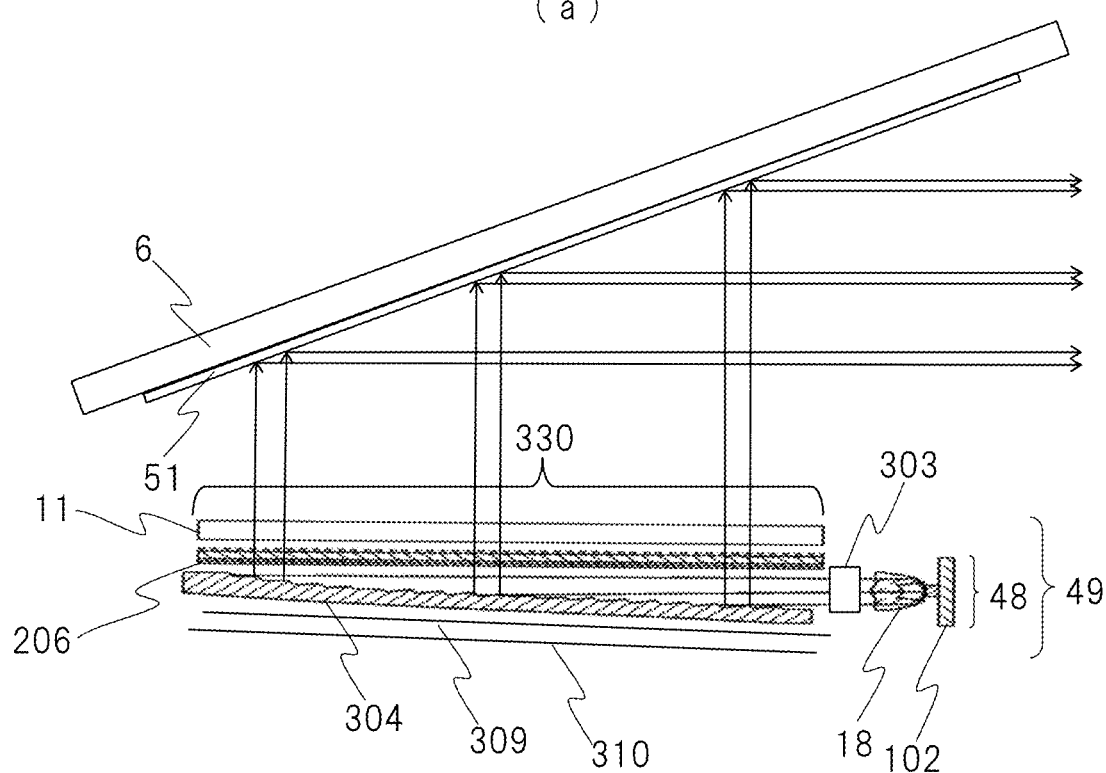
Figure 25:
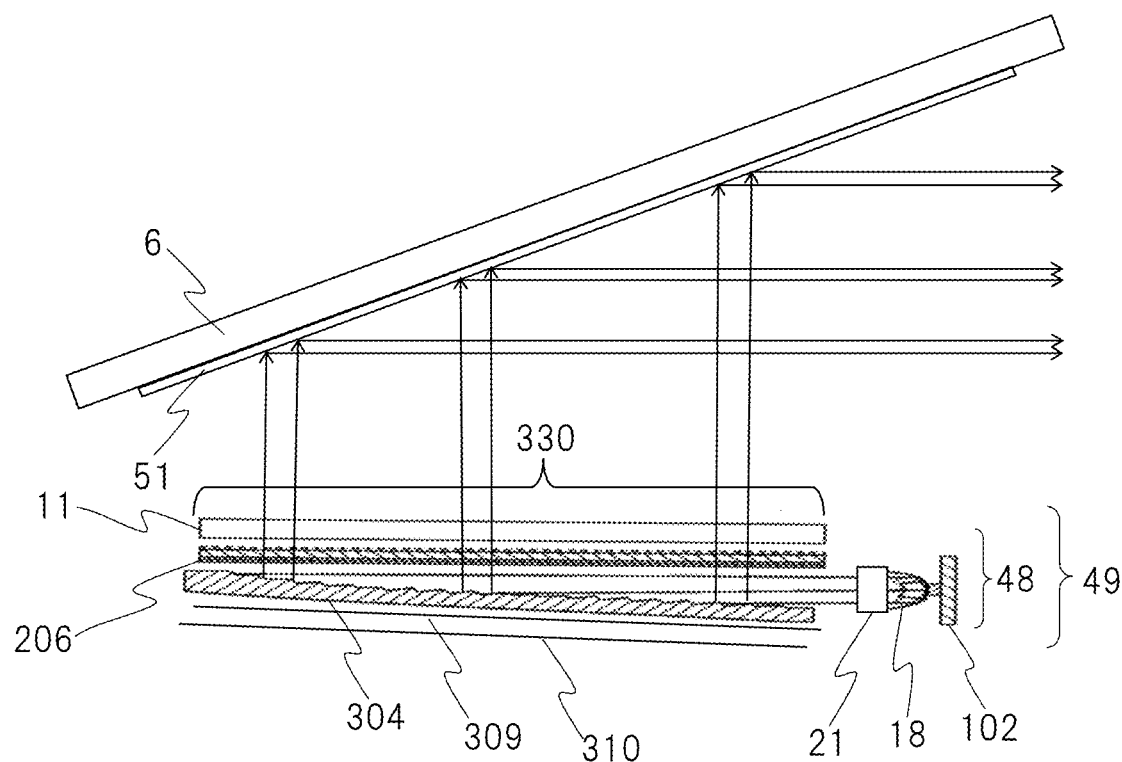

As a specific means for displaying an image through (a part or whole of) the window glass of the automobile, for example, the image display apparatus 49 including the large image display panel 11 as illustrated in FIG. 1 is provided along the window glass of the vehicle body. On the back surface of the image display panel 11, a plurality of reflection type light guide bodies 304 constituting the light source apparatus 48 illustrated in FIGS. 24 and 25 are provided as the light source apparatus 48 to obtain image light having a narrow dispersion angle (high straight propagation) and a uniform polarization plane such as light from a plane-emitting laser light source. These light fluxes are modulated in light intensity by the image display panel 11 in accordance with the image signal, and are displayed inside or outside the vehicle through the windshield 6, the rear glass 6', or the side glass 6". A related-art panel for TV can be used as the image display panel 11, and a large liquid crystal panel or a high-resolution panel equivalent to an 8k panel can also be used. A panel of a special specification manufactured by encapsulating liquid crystals that handle high light output into the related-art panel for TV may also be used. In this case, the large liquid crystal panel or the high-resolution panel equivalent to the 8 k panel can also be used.

In addition, utilization for commercial vehicles and ordinary vehicles as illustrated in FIG. 2 has a case of usage of a curved window glass (a windshield, a rear glass, or the like), which results in distortion of an image due to a refraction effect of the glass when the image is monitored from the outside of the vehicle through the glass. Similarly, distortion also occurs in a reflected image due to the curved shape of the window glass even when the image light is reflected on the inner surface of the window glass. To allow the image in a normal shape to be reproduced from the image monitoring side, it is preferable to distort the original image into a corrected shape so that the image after passing through the glass becomes a correct image.

In addition, in the in-vehicle information display system, since the vehicle itself is exposed to natural light including sunlight, it is necessary to cope with such sunlight. However, as illustrated in FIG. 10, the natural light such as the sunlight is not only light in a wide wavelength band from ultraviolet rays to infrared rays, but also exists in a state of mixture of light having two types of polarization directions (hereinafter, referred to as S-polarized light and P-polarized light), that is, light in a vertical oscillation direction to a light traveling direction as the polarization direction and light in a horizontal direction. In particular, in a region where the incident angle on the windshield 6 exceeds 50 degrees, the reflectance on the glass surface varies depending on the S-polarized light, the P-polarized light, and the incident angle, as illustrated in FIG. 9.

Therefore, in the present embodiment, based on the above-described findings by the inventors, that is, considering that much of the sunlight entering through the windshield 6 is the P-polarized light component, it has been confirmed that it is particularly effective to reduce the P-wave component in order to suppress external light including the sunlight emitted into the image display apparatus and that it is effective to use the S-wave component as the image light to be emitted from the image display apparatus to the outside of the vehicle to be recognized by the observer. In addition, the information display system according to the present embodiment reduces the temperature rise of the image display apparatus, and improves the reliability by sensing the region on which the sunlight is incident in the liquid crystal panel serving as the image display apparatus, and turning off the LED of the light source apparatus corresponding to this region to stop the image display.

Figure 4A:
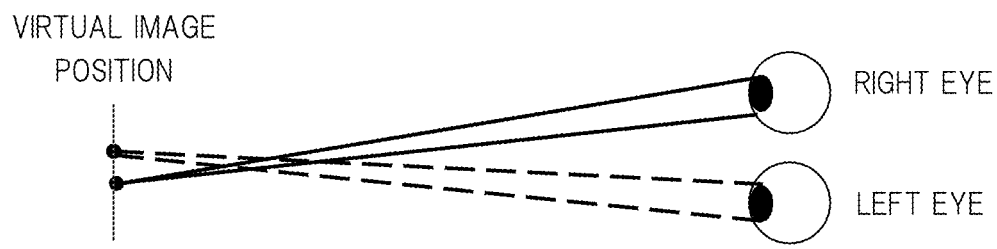
FIG. 4A is an explanatory diagram for explaining a phenomenon in which images of light entering right and left eyeballs in binocular vision are displaced to form a double image.
Figure 4B:
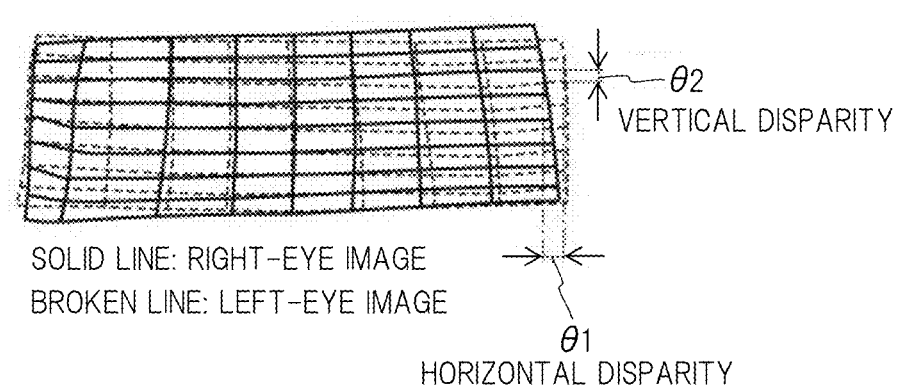
FIG. 4B is a schematic diagram illustrating distortion of left and right images due to binocular vision.

The problems of the above-described in-vehicle information display system will be described in detail below. FIG. 4A is a schematic diagram for explaining the principle of the generation of the double image, which is generated by binocular disparity as the first problem. As illustrated in FIG. 4B, displacement occurs between the image recognized by the observer with the right eye and the image recognized with the left eye. The reason of this is that disparity due to a difference in the eyeball position causes virtual images recognized by both eyes to look different from each other since the relative curvatures of the windshield 6 serving as the reflection surface are different.

Figure 4C:
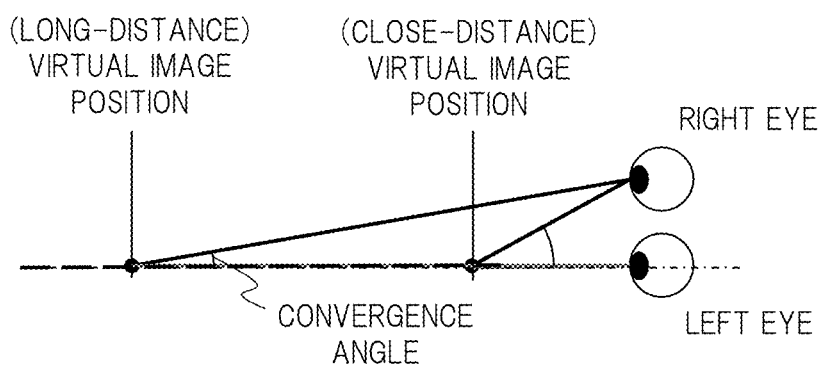
FIG. 4C is a schematic diagram illustrating a displacement between left and right images due to binocular vision depending on a difference in virtual image distance.

The reason of this is that the optical system that forms the virtual image differs due to the above-described binocular disparity. To solve this problem, the influence of the double image is reduced by putting the virtual image distance at the long distance as illustrated in FIG. 4C to reduce an angle at which the virtual image caused by the disparity due to the pupillary distance (60 mm on average) is viewed. The inventors have experimentally found that the virtual image distance more than 8 m exceeds an identification range of an observer with visual acuity of 1.0, and the virtual image distance of 13 m makes an observer with visual acuity of 1.2 or more difficult to identify the image.

Figure 5:
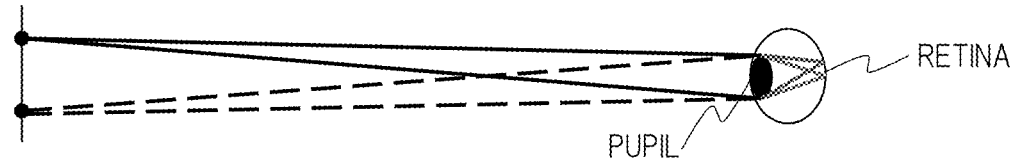
Figure 5:
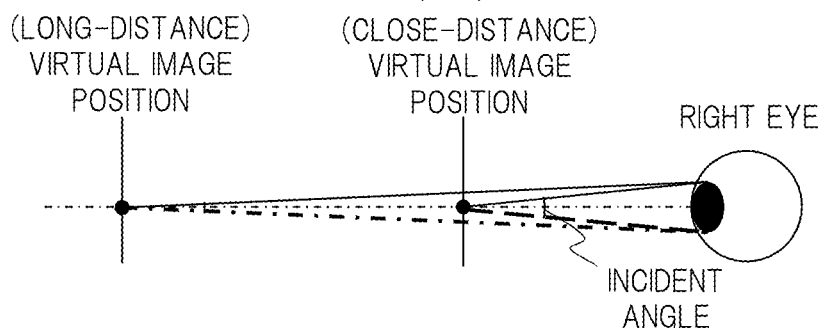

FIG. 5(*a*) is a schematic diagram illustrating the principle of the generation of a longitudinal double image that is generated as the second problem since reflected images at two air interfaces of the windshield 6 are displaced, pass through the pupil of the observer, and are formed on the retina. To solve this problem, it is preferable to move the virtual image distance to the long distance as illustrated in FIGS. 5(*b*) and 6 to reduce the angle at which the virtual images generated due to the two reflection surfaces of the windshield 6 is viewed. The inventors experimentally determined a virtual image distance such that the double image is at a practically acceptable level. As a result, they found that the virtual image distance more than 12 m exceeds an identification range of an observer with an average pupil diameter of 7 mm and the visual acuity of 1.0, and the virtual image distance of 15 m makes an observer with the average pupil diameter and the visual acuity of 1.2 or more difficult to identify the image. A second solution for reducing the above-described double images generated in principle will be described later.

FIG. 7 is a cross-sectional structure schematically illustrating a state in which the in-vehicle information display system of the present application is arranged in the vehicle body. The image display apparatus 49 includes the light source apparatus that supplies a specific polarized wave having narrow dispersion characteristics to the liquid crystal display element, and the image display panel 11 provides a desired image by modulating the output light intensity of the supplied light in accordance with the image signal. With this configuration, since there is no space serving as the optical path, it is possible to allow the apparatus volume to be significantly compact, as compared with the related-art HUD illustrated in FIG. 20 providing the virtual image by enlarging the image of the small image display apparatus 55 by using the concave mirror 1.

When the windshield 6 is inclined at 45 degrees or more with respect to the horizontal axis, it is necessary to incline the image display apparatus 49 (indicated by an inclination angle θ2 in FIG. 7) to the window glass side with respect to the horizontal axis as illustrated in FIG. 7, and the image display position of the window glass in the up and down directions can be optionally determined by using the above-described 82 and the distance between the screen center of the image from the image display apparatus and the lower end of the windshield 6 as parameters. However, when the θ2 is used as the parameter, attention needs to be paid since a reflection angle θ1 of the image light having been reflected by the windshield 6 changes. Since almost the entire surface of the windshield 6 can be used as the reflection surface by widening the display region of the image display apparatus 49, it is possible to display an image in a part of the display region, and perform the image display at the optimal position in accordance with an output of a camera (not illustrated) that senses the viewpoint position of the driver who is an image observer. Therefore, it is possible to provide the information display system that does not need to be precisely installed to the vehicle body at the manufacturing line of the automobile, and that allows the display position to be appropriately changed at the dealer in accordance with the viewpoint of the customer. Although the generated image distortion differs depending on the display position of the window glass in this case, it is possible to reduce the distortion of the image reflected by the windshield 6 by photographing the display image with the camera in accordance with the viewpoint of the customer, and distorting the image displayed on the image display apparatus for reverse correction based on the obtained image information.

The image light flux from the image display apparatus 49 is emitted through a protective cover 41 toward the windshield 6, then reflected by the windshield 6, and reaches the observer. The protective cover 41 may protect the image display panel 11 from dirt, moisture, and the like, and may also have an action to block ultraviolet rays, infrared rays, and the like that are part of sunlight.

A first embodiment of the in-vehicle information display system of the present application will be described below with reference to FIG. 11 in regard to the image information display position (the image reflection position on the window glass and the image forming position of the virtual image) and the display contents suitable for each display region. As illustrated in FIG. 11, the image display apparatus 49 is arranged between the steering wheel and the window glass, and the surface is covered with the protective cover 41 to prevent dust, moisture, and the like from entering from the outside. Furthermore, the stress (load) of sunlight on the image display apparatus 49 is reduced by providing the filter characteristics of cutting near-infrared light, infrared light, P-polarized waves, and the like in the sunlight. The protective cover 41 illustrated in FIG. 7 is detachable similarly to the image display apparatus 49. When the image display apparatus 49 is taken out of the vehicle as the above-described outdoor tablet terminal or when the image display apparatus having the same panel size and a higher resolution is developed in the future, it is possible to easily increase the resolution of the image display apparatus 49 only by removing the protective cover 41.

The display region of the image display apparatus 49 is the right half region of the outside environment viewed through the front windshield 6 of a right-hand-drive vehicle model, that is the front (illustrated as a display region "d") of the seat on which the driver is seated, and necessary information for a plurality of regions (display region "a", display region "b", and display region "c") is displayed in a necessary period and timing if needed. For the display image, navigation information and vehicle exterior information obtained by the in-vehicle camera 100 are analyzed by a surroundings monitoring device 63 illustrated in FIG. 1, information that interferes with driving such as an obstacle and people is selected, and alert information is generated and superimposed on the display apparatus to call attention.

FIG. 12 is a graph obtained by plotting investigation results of movement of the driver's eyeline during driving in a passenger car (urban driving at 50 km/h), made by the inventors. The eyeline is usually in the range of −3 degrees to 10 degrees (horizontal line) with respect to the reference line, which is 0 degree (the line of sight is about 20 m ahead of the driver). If the line of sight is moved to the speedometer, tachometer, or the like in the instrument panel, the scenery ahead cannot be observed, which interferes with safe driving. From the results, it has been found that the movement of the viewpoint to the instrument panel area is extremely less except when the area is consciously viewed.

In addition, while the viewpoint in the horizontal direction often moves toward the opposite lane on which the oncoming vehicle is traveling, the viewpoint also moves to the left side where the pedestrian is present. Thus, the viewpoints are concentrated in the range of 10 degrees in each of the right and left sides (the right-side movement is particularly frequent) from 20 m ahead of the driver. Therefore, the alert display for an event occurring outside of this range to call the attention is an important factor for the safe driving assistance. If the distance from the eyes of the driver to the center of the image reflection position of the windshield 6 is supposed to be 1 m, the driver who is driving on a general road at 50 km/h can usually visually recognize the range of ±10 degrees, and therefore, it has been found that the display of the alert information at a place exceeding the range of ±160 mm from the center of the line of sight on the windshield leads to the driver's awareness, in other words, leads to the display of the call attention information during the driving at the same level regardless of the vehicle speed by moving the display position of the alert information into the horizontal-direction visual recognition range of the driver, based on the information of the sensor sensing the vehicle speed, the alert information being not normally displayed during high-speed driving compared with low-speed driving.

Then, the inventors have found that the position that does not interfere with driving as an optimal display position when the HUD displays the speed information, the engine speed, the remaining amount of fuel or the battery, the temperature of coolant and others that are necessary for the operation of the automobile is the region of the display position Furthermore, it has been found that, to visually recognize the navigation information or the like at a position far from a fork in a road, it is advantageous in both viewpoints of visual recognition and convenience to change the display position depending on a situation of the road or the position of the subject vehicle such as the display of the navigation information in the display region "b" when the fork in the road approaches the display region "a" in the upper portion of the screen.

On the other hand, the viewpoint movement range (not illustrated) of the driver is further narrowed during high-speed driving (0 degrees as the reference line and the line of sight is about 40 m ahead of the driver), and results of a similar evaluation during high-speed driving (driving at 100 km/h) show characteristic results such that a range of ±5 degrees on the right and left sides with respect to the front side is visually recognizable, such that gazing at a passing vehicle on the right side is frequent during driving in a running lane, and such that gazing at a median strip is frequent during driving in a passing lane. In addition, regarding the extent of gazing at a close-distance view and a long-distance view, the frequency of viewing the long-distance view with the viewpoint of two degrees or more was 90% or more. The above-described measurement results of the viewpoint movement of the driver are evaluation results under the condition that the driver is taking a seat on the right side of the vehicle and is driving on the left side.

In summary, in the high-speed driving, the visual recognition range of the driver is about ±5 degrees, and the front side at the viewing angle of 2 degrees or more is monitored. In the driving at the speed of 50 km/h, the visual recognition range is about ±10 degrees on the left and right sides, and the viewing angle is in the range of ±5 degrees. That is, it is preferable to change the display position of the image depending on the vehicle speed, and thus, the necessary resolution is four times different between the driving at 50 km/h and the driving at 100 km/h. In addition, when the subject vehicle stops, it is preferable to use all the panel resolutions of the image display apparatus. That is, as described above, the visual recognition of the observer can be improved by changing the resolution of the display image in accordance with the image reflection position on the window glass.

The inventors have experimentally determined the necessary resolution in accordance with the image display position on the window glass. As a result, it has been found that a resolution of 80 dots/degree or less is acceptable in the upper portion of the window glass (a diopter scale of 5 degrees or more), and a resolution of 120 dots/degree or less is enough in the central portion (a diopter scale of around 0 degrees). In addition, a resolution equivalent to WQXGA (1920×1200 dots) is required to satisfy the above-described conditions and obtain an enough resolution as a tablet terminal in the vehicle stop state.

It has also been found that a resolution of (1280×720 dots) is sufficient for dedicated use as the in-vehicle image display apparatus.

Next, a second embodiment of the in-vehicle information display system of the present application will be described below with reference to FIG. 13 in regard to the image information display position (the image reflection position on the window glass and the image forming position of the virtual image) and the display contents suitable for each of the display region. The image display apparatus 49 (not illustrated) is arranged between the steering wheel 43 and the windshield 6, and the surface is covered with the protective cover 41 to prevent dust, moisture, and the like from entering from the outside, as similar to the first embodiment. Furthermore, the stress (load) of sunlight on the image display apparatus 49 is reduced by providing the filter characteristics of cutting near-infrared light, infrared light, P-polarized waves, and the like in the sunlight.

The display region of the image display apparatus 49 is the entire region of the outside environment viewed through the front windshield 6, that is, the entire front of the seat on which the driver is seated (illustrated in a display region "f"), and the HUD displays information necessary for the operation of the automobile such as the speed information, the engine speed, the remaining amount of fuel and battery, and the temperature of coolant at a position that does not interfere with driving (displayed at a display position "e" in the drawing) as an optimal display position. As a result, the instrument panel is unnecessary in the vehicle illustrated in FIG. 13, and a large space is generated between the steering wheel and the windshield 6, so that the large image display apparatus 49 can be arranged. As a result, it is possible to display a virtual image V1 with the entire surface of the windshield 6 serving as a reflection surface as illustrated in FIG. 14.

In addition, it is also possible to display smartphone information, entertainment information such as a movie and TV image, regional information during driving, and the like in front of the passenger seat within a range not interfering with driving, as necessary. In this case, the height of the screen of the image display apparatus 49 in the vertical direction is substantially equal to the height of the windshield 6 in the vertical cross section, although slightly varying depending on the inclination of the windshield 6. Therefore, the liquid crystal panel has a large longitudinal length (screen longitudinal dimension) as illustrated in FIG. 14.

Meanwhile, since the aspect ratio of the windshield 6 in a general passenger car when viewed from the observer is "2.5:1" or more, a liquid crystal panel having an individually-adjusted aspect ratio may be used, or this can also be achieved by using a plurality of liquid crystal panels for TV having an aspect ratio of "16:9". In addition, when a transparent sheet 7b, 51 described later is provided on the indoor side surface of the windshield 6, the double image of the display image and the damage of the sunlight incidence on the image display apparatus 49 can be significantly reduced.

A third embodiment of the in-vehicle information display system of the present application will be described with reference to FIG. 15. The image information is displayed by providing a combiner 301 between the windshield 6 and the steering wheel 43. The image display apparatus 49 (not illustrated) is prevented from entry of dust, moisture, and the like from the outside when being arranged between the steering wheel 43 and the windshield 6 and having the surface covered with the protective cover 41, as similar to the above-described two embodiments. Furthermore, the stress (load) of sunlight on the image display apparatus 49 is reduced by providing the filter characteristics of cutting near-infrared light, infrared light, P-polarized waves, and the like in the sunlight.

The display region of the image display apparatus 49 is the entire region of the outside environment viewed through the combiner 301, that is, the entire surface of the combiner facing the seat on which the driver is seated (illustrated in a display region "g" and a display region "h"), and information such as the speed information, the engine speed, the remaining amount of fuel and battery, the temperature of coolant, and the like necessary for the operation of the automobile is displayed at a position that does not interfere with driving (displayed in the display position "h" in the drawing, or a virtual image "V2" in FIG. 16) as an optimal display position for HUD display. In addition, navigation information or the like is formed at a position corresponding to the virtual image V1 at a long distance, and is superimposed and displayed on the combiner 301 information. As a result, the instrument panel is unnecessary in the vehicle illustrated in FIG. 15, and a large space is generated between the steering wheel and the windshield 6, so that the large image display apparatus 49 including the combiner 301 can be arranged.

As a result, it is possible to display the virtual image V1 taking the upper portion of the entire surface of the combiner 301 as the reflection surface and the virtual image V2 taking the lower portion of the entire surface as the reflection region, as illustrated in FIG. 16.

In addition, it is also possible to display smartphone information, entertainment information such as a movie and TV image, regional information during driving, and the like in front of the passenger seat within a range not interfering with driving, as necessary. At this time, the height of the screen of the image display apparatus 49 in the vertical direction is substantially equal to the height of the windshield 6 in the vertical cross section, although slightly varying depending on the inclination of the windshield 6. Therefore, the liquid crystal panel has a great longitudinal width (screen longitudinal dimension) as illustrated in FIG. 14.

Meanwhile, since the aspect ratio of the combiner 301 in a general passenger car when viewed from the observer is "2.0:1" or more, a liquid crystal panel having an individually-adjusted aspect ratio may be used, or this can also be achieved by using a plurality of liquid crystal panels for TV having an aspect ratio of "16:9". In addition, when a transparent sheet 7b, 51 described later is provided on the indoor side surface of the windshield 6, the double image of the display image and the damage of the sunlight incidence on the image display apparatus 49 can be significantly reduced.

In the three embodiments described above, the relation among a virtual image distance L3, the image display position, and the optimal image display size will be described with reference to FIGS. 17 and 18. FIG. 17 is a view schematically representing a state in which the observer is viewing the virtual image V1 of the image information displayed on the image display apparatus 49 of the present application through the windshield 6. The dimension of the virtual image V1 is determined by a ratio between the virtual image distance L3 and (L1+L2). Considering a case where the display distance L3 of the virtual image is 2 m as a reference as illustrated in FIG. 18, if, as illustrated in FIG. 12, the angle where the image is displayed 20 m ahead is defined as a reference angle (0 degree) while the horizontal dimension of the image display apparatus necessary for displaying a virtual image having the horizontal dimension of 20 inches at the virtual image display position of 2 m (recognized by the pupil movement equivalent to −2.5 degrees) is selected as 20 inches, then the virtual image displayed at the display position of 20 m (reference angle: 0 degree) using the same image display apparatus 49 is equivalent to 200 inches. Similarly, at the virtual image display position of 40 m (recognized by the 2.4-degree equivalent pupil movement), a 400-inch equivalent virtual image can be displayed (indicated by a mark ● in FIG. 18). That is, in the present embodiment, it is possible to provide an information display system having the unprecedented advantage of being capable of optionally determining the display distance of the virtual image and the size of the image by using the position at which the image light flux from the image display apparatus 49 is reflected by the windshield 6 as a parameter, and at the same time, changing the angle formed by the image display apparatus and the window glass.

Similarly, as illustrated in FIG. 18, if the angle where the image is displayed 20 m ahead is defined as the reference angle (0 degree) while the horizontal dimension of the image display apparatus necessary for displaying a virtual image having the horizontal dimension of 7 inches at the virtual image display position 2 m (recognized by the −2.5-degree equivalent pupil movement) is selected as 7 inches, then the virtual image displayed at the display position of 20 m (reference angle: 0 degree) using the same image display apparatus 49 is equivalent to 95 inches. Similarly, at the virtual image display position of 40 m (recognized by the 2.4-degree equivalent pupil movement), a 190-inch equivalent virtual image can be displayed (indicated by a mark A in FIG. 18). That is, in the present embodiment, it is possible to provide an information display system that causes a field of view (FOV) in which the observer is viewing the image to be constant by using the position at which the image light flux from the image display apparatus 49 is reflected on the windshield 6 as a parameter, and thus it is possible to provide an information display system having the unprecedented advantage of being capable of optionally changing the display distance of the virtual image and the size of the image by using the display height as a parameter as a means for changing the display distance of the virtual image and the size of the image, that is, using the installation position of the image display apparatus 49 arranged between the lower end of the windshield 6 and the steering wheel as the parameter. The reason why the information display system according to the above-described embodiment of the present application can display a desired virtual image at each position to deal with a case where the FOV is constant while the virtual image display distance is used as a parameter is that the image light from the image display apparatus 49 has a narrow divergence angle and is emitted as telecentric image light as described later.

Example 1 of Image Display Apparatus

FIG. 22 illustrates an example of a specific configuration of the image display apparatus 49. In FIG. 22, the image display panel 11 and the light flux direction conversion means 54 are arranged on the light source apparatus 48 of FIG. 21. The light source apparatus 48 is formed in a case shape as illustrated in the drawing, is made of, for example, plastic or the like, and houses the LED element 200 and the light guide 203. As illustrated in FIG. 21, the end surface of the light guide 203 is provided with a lens shape having a shape such that the cross-sectional area gradually increases toward the opposite surface facing the light receiving portion to convert the divergent light from each LED element 200 into a substantially collimated light flux, and having the action of gradually decreasing the divergence angle by totally reflecting the light flux a plurality of times when the light flux propagates inside. The image display panel 11 constituting the image display apparatus 49 is installed to its upper surface. In addition, the LED element 200 serving as a semiconductor light source and an LED substrate 202 on which a control circuit of the LED element 200 is mounted may be installed to one side surface (a left end surface in this example) of the case of the light source apparatus 48, and a heat sink serving as a member for cooling heat generated in the LED element 200 and the control circuit may be installed to an outer side surface of the LED substrate 202.

Furthermore, to a frame (not illustrated) of the image display panel 11 installed to an upper surface of the case of the light source apparatus 48, the image display panel 11 attached to the frame, flexible printed circuits (FPCs) (not illustrated) electrically connected to the image display panel 11, and the like are installed. That is, the image display panel 11 including the liquid crystal display element generates the display image together with the LED element 200 serving as a solid light source by modulating the intensity of the transmitted light based on the control signal from the control circuit (not illustrated) constituting the electronic apparatus. At this time, since the generated image light has a narrow dispersion angle and only contains a specific polarized wave component, an unconventional new image display apparatus approximate to the plane-emitting laser image source driven by the image signal can be obtained. Currently, it is technically and safely impossible for a laser apparatus to provide a laser light flux having the same size as that of the image provided by the above-described image display apparatus 49. Therefore, in the present embodiment, light approximate to the above-described plane-emitting laser image light is provided from the light flux from, for example, the general light source including the LED element.

Next, a configuration of the optical system of the light source that is housed in the case of the light source apparatus 48 and can be thinned will be described in detail with reference to FIG. 23, together with FIG. 22.

Since FIGS. 22 and 23 are cross-sectional views, merely one of the plurality of LED elements 200 constituting the light source is illustrated, and the light is converted into substantially collimated light by the shape of the light receiving end surface 203a of its light guide 203. For this reason, the light receiving portion of the light guide end surface and the LED element are installed so as to maintain a predetermined positional relation. Each light guide 203 is made of, for example, a light-transmittable resin such as acrylic resin. The LED light receiving surface of the light guide end has, for example, a conical convex outer peripheral surface obtained by rotating a paraboloid cross section, a top of which has a concave portion with a convex center portion (that is, the convex lens surface), and a center of a flat surface of which has a convex lens surface protruding outward (alternatively, may be a concave lens surface recessed inward) (not illustrated). The outer shape of the light receiving portion of the light guide to which the LED element 200 is installed has a paraboloid shape forming the conical outer peripheral surface, and is designed within the range of angles at which the peripherally-emitting light from the LED element can be totally reflected inside the light receiving portion, or is provided with a reflection surface.

On the other hand, each LED element 200 is arranged at a predetermined position on the surface of the LED substrate 202 serving as the circuit board of the LED element 200. The LED substrate 202 is arranged and fixed to an LED collimator (light receiving end surface 203a) such that each LED element 200 on the surface of the LED substrate 202 is positioned at the central portion of the above-described concave portion.

According to a configuration, it is possible to take out the light emitted from the LED element 200 can be extracted as the substantially collimated light by the shape of the light receiving end surface 203a of the light guide 203, and the utilization efficiency of the generated light can be improved.

As described above, the light source apparatus 48 is configured to install the light source unit, in which the plurality of LED elements 200 serving as light sources are arranged, to the light receiving end surface 203a serving as the light receiving portion provided on the end surface of the light guide 203, and guides the divergent light flux from the LED element 200 as the substantially collimated light by using the lens shape of the light receiving end surface 203a of the light guide end surface to propagate inside the light guide 203 as indicated by an arrow (direction parallel to the drawing), and then, reflects the light-source light propagated substantially parallel to the light guide toward the image display panel 11 by using the light flux direction conversion means 204 (a frontward vertical direction from the drawing sheet). The image light flux whose light intensity is modulated in accordance with the image signal by the image display panel 11 becomes in a desired direction by the light flux direction conversion means 54. The uniformity of the light flux entering the image display panel 11 is controlled by the inside or the shape of the surface of the light guide to optimize the distribution (in-plane density) of the light source light flux.

The above-described light flux direction conversion means 204 emits the light flux that has propagated inside the light guide toward the image display panel 11 arranged substantially in parallel with the light guide (the frontward vertical direction from the drawing sheet) by providing, for example, a portion having a different refractive index to the shape of the surface of the light guide or the inside of the light guide. At this time, in a state in which the image display panel 11 correctly faces the center of the screen while the viewpoint is set on the same position as the screen diagonal dimension, if the relative luminance ratio in comparison in the luminance between the screen center and the screen periphery is 20% or more, then is at a practically acceptable level. If the relative luminance ratio exceeds 30%, more excellent characteristics are obtained.

FIG. 22 is a cross-sectional arrangement view for explaining a configuration and actions of the light source of the present embodiment that performs polarization conversion in the light source apparatus 250 including the light guide 203 and the LED element 200 described above. In FIG. 22, the light source apparatus 48 includes the light guide 203 made of, for example, plastic or the like, and provided with the light flux direction conversion means 204 on the surface or inside thereof, the LED element 200 serving as the light source, a reflection sheet 205, a retardation plate 206, a lenticular lens, and the like, and the image display panel 11 including the polarizing plate on the light-source light incident surface and the image light emission surface is installed to the upper surface of the light source apparatus 250.

In addition, a film or sheet-like reflection type polarizing plate 52 is provided on the light-source light incident surface (the lower surface in the drawing) of the image display panel 11 corresponding to the light source apparatus 250, and a one-side polarized wave (for example, a P wave 212) of the natural light flux 210 emitted from the LED element 200 is selectively reflected, is reflected by the reflection sheet 205 provided on one surface (the lower surface in the drawing) of the light guide 203, and is directed to the image display panel 11 again. Then, the retardation plate ($\lambda/4$ plate) is provided between the reflection sheet 205 and the light guide 203 or between the light guide 203 and the reflection type polarizing plate 52, and the light flux is reflected by the reflection sheet 205 to cause the reflected light flux of the one polarized wave to pass twice, so that the reflected light flux is polarized and converted from the P-polarized light into the S-polarized light to improve the utilization efficiency of the light-source light. Since the image light flux whose light intensity is modulated in accordance with the image signal in the image display panel 11 (arrow 213 in FIG. 22) is incident on the windshield 6 at a large incident angle as illustrated in FIGS. 7 and 8, the reflectance on the transparent sheet 7b increases, and thus, good characteristics for monitoring the image inside the vehicle can be obtained.

As similar to FIG. 22, FIG. 23 is a cross-sectional arrangement view for explaining a configuration and actions of the light source of the present embodiment that performs polarization conversion in a light source apparatus 250 including the light guide 203 and the LED element 200. The light source apparatus 101 similarly includes the light guide 203 made of, for example, plastic or the like, and provided with the light flux direction conversion means 204 on the surface or inside thereof, the LED element 200 serving as the light source, the reflection sheet 205, the retardation plate 206, the lenticular lens, and the like, and the image display panel 11 including the polarizing plate on the light-source light incident surface and the image light emission surface is installed as the image display panel 11 to the upper surface of the light source apparatus 250.

In addition, the film or sheet-like reflection type polarizing plate 52 is provided on the light-source light incident surface (the lower surface in the drawing) of the image display panel 11 corresponding to the light source apparatus 250, and a one-side polarized wave (for example, an S wave 211) of the natural light flux 210 emitted from the LED element 200 is selectively reflected, is reflected by the reflection sheet 205 provided on one surface (the lower surface in the drawing) of the light guide 203, and is directed to the image display panel 11 again. It is also possible to provide the retardation plate ($\lambda/4$ plate) between the reflection sheet 205 and the light guide 203 or between the light guide 203 and the reflection type polarizing plate 52, and reflect the light flux by the reflection sheet 205 to cause the reflected light flux to pass through the retardation plate twice, so that the reflected light flux is polarized and converted from the P-polarized light to the S-polarized light. As described above, in the present invention, since the light-source light flux that is natural light is converted to be substantially parallel, and simultaneously can be converted into the light flux of the specific polarized wave, the light can be selected in accordance with the characteristics of the liquid crystal panel 11, so that the utilization efficiency of the light-source light can be improved. Therefore, since the image light flux whose light intensity is modulated in accordance with the image signal in the image display panel 11 (arrow 214 in FIG. 23) is incident on the windshield 6 at a large incident angle as illustrated in FIG. 7, the reflectance on the transparent sheet 7b increases, and thus, good characteristics for monitoring the image inside the vehicle can be obtained.

In the light source apparatus illustrated in FIGS. 22 and 23, in addition to the action of the polarizing plate provided on the light incident surface of the corresponding image display panel 11, high contrast performance is obtained since the theoretically-obtained contrast ratio is a value obtained by multiplying the reciprocal of the cross transmittance of the reflection type polarizing plate by the reciprocal of the cross transmittance obtained by the two polarizing plates attached to the liquid crystal display panel because the one-side polarization component is reflected by the reflection type polarizing plate. Practically, it has been experimentally confirmed that the contrast performance of the display image is improved by 10 times or more. As a result, a high-quality image comparable to that of self-luminous organic EL apparatuses has been obtained. In addition, since the light source apparatus 48 can be thinned, it is one of technical means for providing an image display apparatus used in combination with the above-described tablet terminal.

Example 2 of Image Display Apparatus

FIG. 26 illustrates another example of the specific configuration of the image display apparatus 49. In the image display apparatus 49 of FIG. 26, the light source apparatus 48 of FIG. 1, etc., is replaced with a light source apparatus 101. As also illustrated in the drawing, the light source apparatus 101 is made of, for example, plastic or the like, inside the case (see FIG. 26), and is configured to house an LED, a collimator, a synthesis/dispersion block, a light guide, and the like therein, and the image display panel 11 is installed to the upper surface of the light source apparatus 101. In addition, an LED element 14*a*, 14*b* serving as a semiconductor light source and an LED substrate 102 illustrated in FIG. 27 on which a control circuit of the LED element 14*a*, 14*b* is mounted are installed to one side surface of the case of the light source apparatus 101, and a heat sink 103 serving as a member for cooling heat generated in the LED element and the control circuit is installed to the outer surface of the LED substrate 102.

In addition, to the liquid crystal display panel frame installed to the upper surface of the case, the image display panel 11 installed to the frame, flexible printed circuits (FPCs) 403 (see FIG. 26) electrically connected to the image display panel 11, and the like are installed. That is, the image display panel 11 including the liquid crystal display element generates the display image by modulating the intensity of the transmitted light based on the control signal from the control circuit (not illustrated here) constituting the electronic apparatus, together with the LED element 14*a*, 14*b* serving as the solid light source.

Example 3 of Image Display Apparatus

Next, another example of the specific configuration of the image display apparatus 49 will be described with reference to FIG. 24(*a*). The light source apparatus 48 of the image display apparatus 49 converts the divergent light flux of the natural light (that is the mixture of the P-polarized wave and the S-polarized wave) from the LED substantially into the collimated light flux by using an LED collimator 18, and the light flux passes through an optical element 303 that converts the dispersion characteristics, and is then reflected by the reflection type light guide 304 toward the image display panel 11. The reflected light enters the waveplate and the reflection type polarizing plate 206 arranged between the image display panel 11 and the reflection type light guide 304. The specific polarized wave (for example, the S-polarized wave) is reflected by the reflection type polarizing plate, the phase is converted by the waveplate, and the wave returns to the reflection surface and passes through the retardation plate again, so that the wave is converted into the polarized wave (for example, the P-polarized wave) that passes the reflection type polarizing plate.

As a result, the natural light from the LED is unified into the specific polarized wave (for example, the S-polarized wave), enters the image display panel 11, is modulated in luminance in accordance with the image signal, and displays the image on the panel surface. As similar to the above-described example, a plurality of LEDs constituting the light source are illustrated (however, merely one LED is illustrated in FIGS. 24(*a*) and 24(*b*) because of a longitudinal cross section), and the LEDs are installed to the LED collimator 18 at a predetermined position. Each of the LED collimators 18 is made of, for example, a light-transmittable resin such as acrylic resin or glass. The LED collimator 18 has a conical convex outer peripheral surface obtained by rotating a paraboloid cross section, a top of which has a concave portion with a convex center portion (that is, the convex lens surface), and a center of a flat surface of which has a convex lens surface protruding outward (alternatively, may be a concave lens surface recessed inward) (not illustrated). The paraboloid shape forming the conical outer peripheral surface of the LED collimator 18 is designed within the range of angles at which the peripherally-emitting light from the LED element can be totally reflected inside the light receiving portion, or is provided with a reflection surface.

The light converted into the substantially collimated light by the LED collimator 18 is unified into the one-side polarized wave (for example, the S-polarized light) by a polarization conversion element 21 as illustrated in FIG. 24(*b*), then is reflected by the reflection type light guide 304, and is unified into the specific polarized wave again due to the actions of the waveplate (retardation plate) and the reflection type polarizing plate. As a result, the polarization level can be increased and thus a high contrast can be achieved. In the second embodiment of FIG. 24(*b*), it goes without saying that the same effects as those of the first embodiment can be obtained even if the above-described reflection type polarizing plate and waveplate are removed.

Next, another example of the specific configuration of the image display apparatus 49 will be described with reference to FIG. 25(*a*). The light source apparatus 48 of the image display apparatus 49 converts the divergent light flux of the natural light (that is the mixture of the P-polarized wave and the S-polarized wave) out of the LED into the substantially collimated light flux by using the LED collimator 18, and reflects the light flux toward the image display panel 11 by using the reflection surface of the reflection type light guide 304. The specific polarized wave (for example, the P-polarized wave) of the reflected light is reflected by a reflection type polarizing plate 206 arranged between the image display panel 11 and the reflection type light guide 304, and the light of the specific polarized wave that has been transmitted through a transmission portion of the reflection type light guide 304 is reflected by a reflection surface 310, passes through a λ/4 plate (retardation plate) 309 arranged between the light guide 304 and the reflection surface 310 twice while undergoing the polarization conversion (for example, the S-polarized wave), and penetrates the reflection type polarizing plate 206.

As a result, the natural light out of the LED is unified into the specific polarized wave (for example, the S-polarized wave), enters the image display panel 11, is modulated in luminance in accordance with the image signal, and displays the image on the liquid crystal display panel surface, and the image light is provided with desired directionality after passing an optical element 330 that converts the dispersion characteristics. The image light flux is reflected by the windshield and visually recognized by the observer. Since a λ/2 plate (retardation plate) is provided on the reflection surface of the windshield 6 to perform the polarization conversion changing the transmitted light of the S-polarized wave into the P-polarized wave, the reflection on the surface of the windshield 6 in contact with the outside of the vehicle can be significantly reduced, and the double image of the image light can be reduced down to a practically acceptable level.

In comparison with the above-described image display apparatus 49, the embodiment illustrated in FIG. 25(b) is configured to include the polarization conversion element 21 that performs the polarization conversion as a first polarization conversion part between the LED collimator 18 and the reflection type light guide 304, and also include, at the subsequent stage, a second polarization conversion part including the reflection type polarizing plate 206, the retardation plate 309, and the reflection surface 310. As a result, the polarization level can be increased and thus a high contrast can be achieved. In the second embodiment of FIG. 25(b), it goes without saying that the same effects as those of the first embodiment can be obtained even if the above-described reflection type polarizing plate and waveplate are removed.

Here, in the related-art TV set, the emission light from the liquid crystal display panel has similar dispersion characteristics in both the screen horizontal direction (indicated by the X axis in FIG. 30(a)) and the screen vertical direction (indicated by the Y axis in FIG. 30(b)). On the other hand, regarding the dispersion characteristics of the emission light flux from the liquid crystal display panel of the above-described embodiment, the viewing angle having the luminance of 50% with respect to that of the front viewing (0-degree angle) is 13 degrees as illustrated in the example 1 of FIG. 30, and therefore, is ⅕ of 62 degrees that is a related-art angle. Similarly, the reflection angle, the reflection surface area, and the like of the reflection type light guide are optimized to suppress the viewing angle on the upper side to be about ⅓ of the viewing angle on the lower side so that the viewing angle in the vertical direction is uneven between the upper and lower sides. As a result, the amount of image light toward the monitoring is significantly improved as compared with the related-art liquid crystal TV, and the luminance becomes 50 times or more.

Furthermore, in the viewing angle characteristics illustrated in the example 2 of FIG. 31, the viewing angle having the luminance of 50% with respect to that of the front viewing (0-degree angle) is 5 degrees, and therefore, is 1/12 of 62 degrees that is the related-art angle. Similarly, the reflection angle, the reflection surface area, and the like of the reflection type light guide are optimized to suppress the viewing angle in the vertical direction to be about 1/12 of the related-art angle so that the viewing angles on the upper and lower sides are even. As a result, the amount of image light toward the monitoring is significantly improved as compared with the related-art liquid crystal TV, and the luminance becomes 100 times or more. As described above, it is possible to concentrate the amount of light flux toward the monitoring by making the viewing angle narrow, and thus, the utilization efficiency of light can be significantly improved. As a result, even when the related-art liquid crystal display panel for TV is used, it is possible to significantly improve the luminance with similar power consumption by controlling the light dispersion characteristics of the light source apparatus, and to provide an image display apparatus compatible with an information display system for outdoor use.

As the basic configuration, as illustrated in FIG. 7, the light flux having the narrow directionality is guided to enter the image display panel 11 by the light source apparatus 48, and the luminance is modulated in accordance with the image signal, so that the image information displayed on the screen of the image display panel 11 is displayed toward the driver or passenger in the cabin through the glass 6. At this time, since the image becomes the double image due to the reflection on both surfaces of the glass, it is preferable to arrange the transparent sheet 51 described later on the glass surface to reduce the double image.

Example 1 of Light Source Apparatus

Next, a configuration of the optical system housed in the case of the light source apparatus 101 illustrated in FIG. 26 and the like will be described in detail with reference to FIGS. 28(a) and 28(b), together with FIG. 27.

Figure 28:
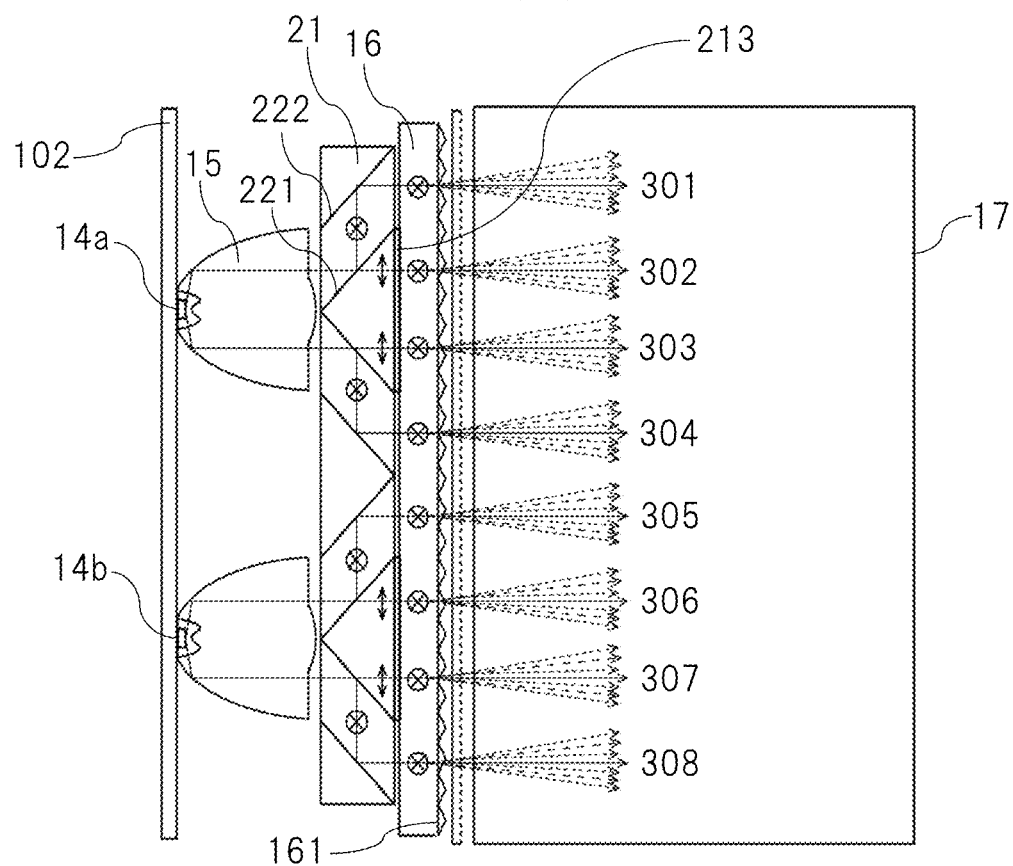
Figure 28:
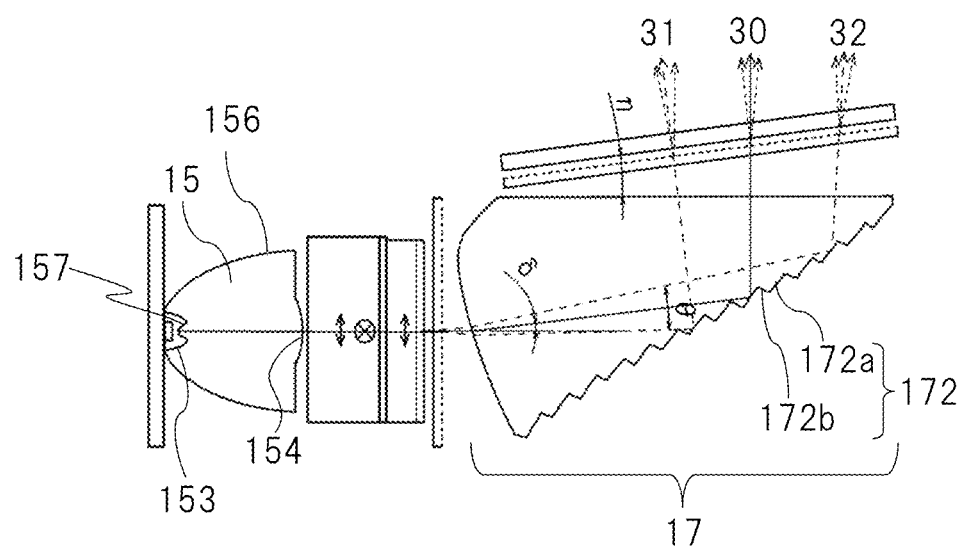

FIGS. 27 and 28 illustrate the plurality of LEDs 14a, 14b (two LEDs in this example) constituting the light source, and the LEDs are installed to a predetermined position of the LED collimator 15. Each of the LED collimators 15 is made of, for example, a light-transmittable resin such as acrylic resin or glass. The LED collimator 15 has a conical convex outer peripheral surface 156 obtained by rotating a paraboloid cross section, a top of which has a concave portion 153 with a convex center portion (that is, the convex lens surface 157), and a center of a flat surface of which has a convex lens surface 154 protruding outward (alternatively, may be a concave lens surface recessed inward). The paraboloid surface forming the conical outer peripheral surface 156 of the LED collimator 15 is designed within the range of angles at which the peripherally-emitting light from the LEDs 14a, 14b can be totally reflected inside the light receiving portion, or is provided with a reflection surface.

In addition, each of the LED 14a, 14b is arranged at the predetermined position on the surface of the LED substrate 102 serving as the circuit board of the LED. The LED substrate 102 is arranged and fixed to the LED collimator 15 such that the LED 14a or 14b on the surface of the LED substrate 102 is positioned at the central portion of the concave portion 153.

According to such a configuration, in particular, the light emitted upward (rightward in the drawing) from the central portion of the light emitted from the LED 14a or 14b by the above-described LED collimator 15 is collected by the two convex lens surfaces 157 and 154 forming the outer shape of the LED collimator 15 and is converted to the collimated light. In addition, the light peripherally emitted from the other portions is reflected by the paraboloid surface forming the conical outer peripheral surface of the LED collimator 15, and is similarly collected and converted to the collimated light. In other words, according to the LED collimator 15 having the convex lens at the central portion and the paraboloid surface at the peripheral portion, almost all the light generated by the LED 14a or 14b can be extracted as the collimated light, and the utilization efficiency of the generated light can be improved.

The polarization conversion element 21 is provided on the light emission side of the LED collimator 15. As clearly seen from FIG. 28, in the polarization conversion element 21, a plurality of combination made of a columnar (hereinafter, a parallelogram columnar) light-transmittable member having a parallelogram cross section and a columnar (hereinafter, a triangular columnar) light-transmittable member having a triangular cross section are arranged in an array in parallel to a plane orthogonal to the optical axis of the collimated light from the LED collimator 15. Furthermore, a polarization beam splitter film 221 and a reflection film 222 are alternately provided at the interface between the adjacent array-arranged light-transmittable members, and a λ/2 phase plate 213 is provided on the emission surface from which the light that has entered the polarization conversion element 21 and penetrated the polarization beam splitter film 221 is emitted.

A rectangular synthesis/dispersion block 16 also illustrated in FIG. 28(a) is further provided on the emission surface of the polarization conversion element 21. That is, the light emitted from the LED 14a or 14b is converted to the collimated light by the action of the LED collimator 15, enters the synthesis/dispersion block 16, is dispersed by a texture 161 on the emission side, and then reaches a light guide 17.

The light guide 17 is a member having, for example, a rod shape with a substantially triangular cross-sectional surface (see FIG. 28(b)) made of a light-transmittable resin such as an acrylic resin, and, as clearly seen in FIG. 27, has a light-guide light incident portion (surface) 171 facing the emission surface of the synthesis/dispersion block 16 to sandwich the first dispersion plate 18a therebetween, a light-guide light reflection portion (surface) 172 forming an oblique surface, and a light-guide light emission portion (surface) 173 facing the image display panel 11 including the liquid crystal display element to sandwich the second dispersion plate 18b therebetween.

The light-guide light reflection portion (surface) 172 of the light guide 17 has a lot of reflecting surfaces 172a and joint surfaces 172b that are alternately formed in a comb-teeth formation as shown in FIG. 27 that is a diagram partially enlarging the light-guide light reflection portion. The reflecting surface 172a (a right-upward slope line segment in the drawing) forms an angle "an" (n: natural number that is, for example, 1 to 130 in the present example) with respect to a horizontal surface shown with a dashed dotted line in the drawing. In one example described here, the angle "an" is set to be equal to or smaller than 43 degrees (but equal to or larger than 0 degree).

The light-guide light incident portion (surface) 171 is formed to have a curved convex shape sloping toward the light source. By this shape, the collimated light that is output from the emission surface of the synthesis/dispersion block 16 is dispersed through the first dispersion plate 18a, enters the light guide 17, reaches and is reflected on the light-guide light reflection portion (surface) 172 while being slightly refracted (polarized) upward by the light-guide light incident portion (surface) 171 as clearly seen in FIG. 27, and reaches the image display panel 11 provided on the emission surface on the upper side of FIG. 27.

According to the image display apparatus 49 described in detail above, it is possible to further improve the light utilization efficiency and the uniform illumination characteristics, and at the same time, it is possible to manufacture the image display apparatus 49 including the modularized S-polarized wave light source apparatus in a small size and at a low cost. In the above description, note that it has been described that the polarization conversion element 21 is installed at the later stage than the LED collimator 15, but the present invention is not limited thereto. The same actions and effects can be obtained by providing the polarization conversion element in the middle of the optical path to the liquid crystal display panel.

As shown in FIG. 27, the light-guide light reflection portion (surface) 172 has a lot of reflecting surfaces 172a and joint surfaces 172b that are alternately formed in a comb-teeth formation. The illumination light flux is totally reflected on each reflecting surface 172a, and travels upward, and besides, enters the light flux direction conversion means 54 that controls the directionality, as the substantially collimated dispersed light flux since the light-guide light emission portion (surface) 173 has the narrow-angle dispersion plate, and obliquely enters the image display panel 11. In the present embodiment, the light flux direction conversion means 54 is provided between the light-guide light emission portion (surface) 173 and the image display panel 11. However, the effects can be obtained even when the light flux direction conversion means 54 is provided on the emission surface of the image display panel 11 as illustrated in FIG. 26.

Example 2 of Light Source Apparatus

Figure 29:
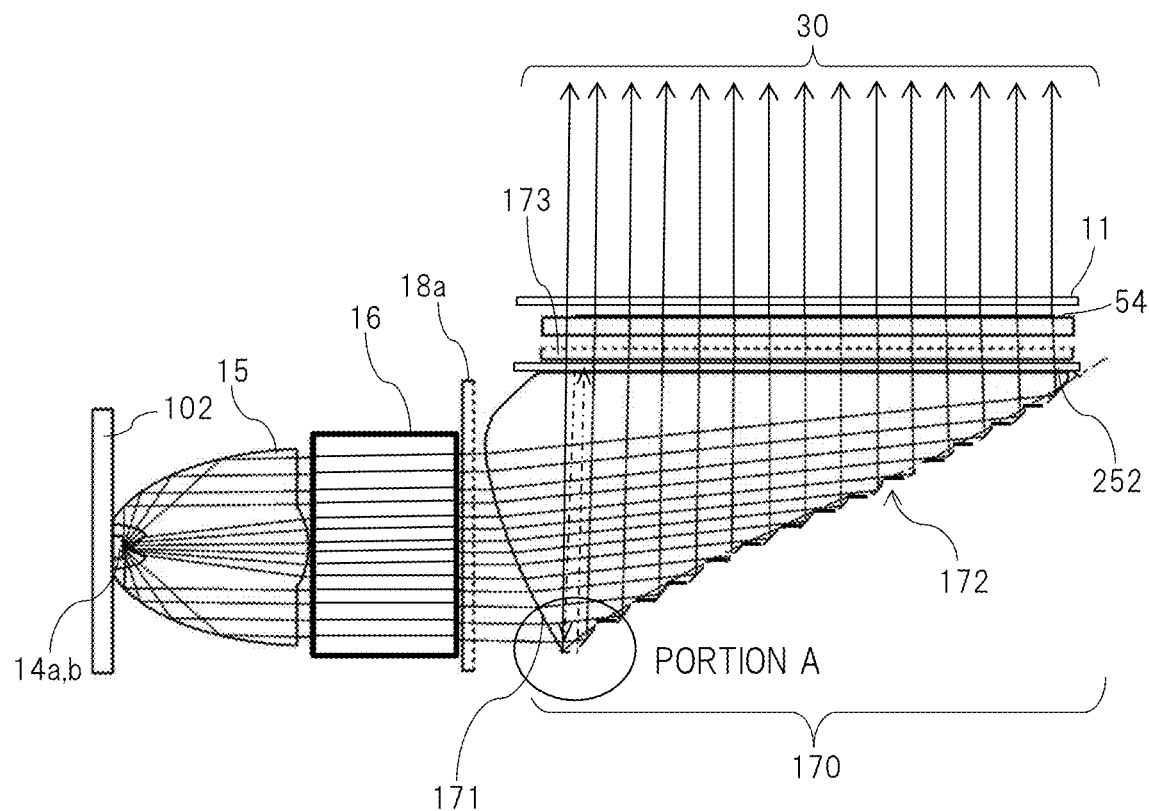
Figure 29:
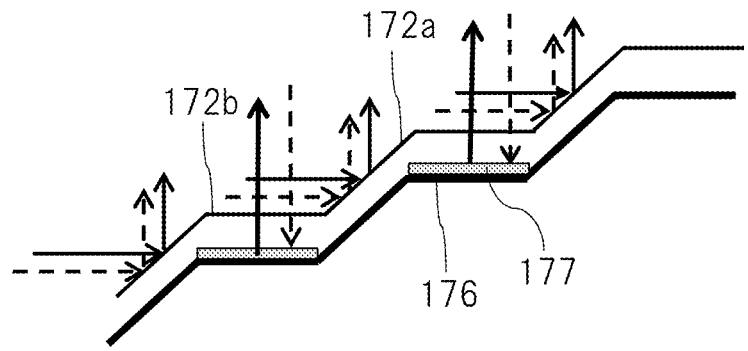

Another example of the configuration of the optical system of the light source apparatus 48 is illustrated in FIG. 29. As similar to the example illustrated in FIG. 28, the plurality of LEDs 14a, 14b (two LEDs in this example) constituting the light source are illustrated, and the LEDs are installed to a predetermined position of an LED collimator 15. Each LED collimator 15 is made of, for example, a light-transmittable resin such as acrylic resin. As similar to the example illustrated in FIG. 28, the LED collimator 15 has a conical convex outer peripheral surface 156 obtained by rotating a paraboloid cross section, a top of which has a concave portion 153 with a convex center portion (that is, the convex lens surface 157), and a center of a flat surface of which has a convex lens surface 154 protruding outward (alternatively, may be a concave lens surface recessed inward). The paraboloid surface forming the conical outer peripheral surface 156 of the LED collimator is designed within the range of angles at which the peripherally-emitting light from the LED 14a can be totally reflected inside the light receiving portion, or is provided with a reflection surface.

In addition, each of the LED 14a, 14b is arranged at the predetermined position on the surface of the LED substrate 102 serving as the circuit board of the LED. The LED substrate 102 is arranged and fixed to the LED collimator 15 such that the LED 14a or 14b on the surface of the LED substrate 102 is positioned at the central portion of the concave portion 153.

According to such a configuration, in particular, the light emitted upward (rightward in the drawing) from the central portion of the light emitted from the LED 14a or 14b by the above-described LED collimator 15 is collected by the two convex lens surfaces 157 and 154 forming the outer shape of the LED collimator 15 and is converted to the collimated light. In addition, the light peripherally emitted from the other portions is reflected by the paraboloid surface forming the conical outer peripheral surface of the LED collimator 15, and is similarly collected and converted to the collimated light. In other words, according to the LED collimator 15 having the convex lens at the central portion and the paraboloid surface at the peripheral portion, almost all the light generated by the LED 14a or 14b can be extracted as the collimated light, and the utilization efficiency of the generated light can be improved.

The light guide 170 is provided on the light emission side of the LED collimator 15 to sandwich the first dispersion plate 18a therebetween. The light guide 170 is a member having, for example, a substantially triangular rod-shaped cross-sectional surface (see FIG. 29(a)) made of a light-transmittable resin such as an acrylic resin, and, as clearly seen in FIG. 29(a), has a light-guide light incident portion (surface) 171 of the light guide 170 facing the emission surface of the synthesis/dispersion block 16 to sandwich the first dispersion plate 18a therebetween, a light-guide light reflection portion (surface) 172 forming an oblique surface, and a light-guide light emission portion (surface) 173 facing the image display panel 11 including the liquid crystal display element to sandwich a reflection type polarizing plate 252 therebetween.

As the reflection type polarizing plate 252, for example, when the one having the characteristics of reflecting the P-polarized light (transmitting the S-polarized light) is selected, the P-polarized wave of the natural light emitted from the LED serving as the light source is reflected, passes through a λ/4 plate 177 provided on the light-guide light reflection portion (surface) 172 illustrated in FIG. 29(*b*), is reflected by a reflection surface 176, and passes through the λ/4 plate 177 again to be converted into the S-polarized wave, so that all the light fluxes entering the image display panel 11 are unified to the S-polarized wave.

Similarly, as the reflection type polarizing plate 252, for example, when the one having the characteristics of reflecting the S-polarized light (transmitting the P-polarized light) is selected, the S-polarized wave of the natural light emitted from the LED serving as the light source is reflected, passes through the λ/4 plate 177 provided on the light-guide light reflection portion (surface) 172 illustrated in FIG. 29(*b*), is reflected by the reflection surface 176, and passes through the λ/4 plate 177 again to be converted into the P-polarized wave, so that all the light fluxes entering the image display panel 11 are unified to the P-polarized wave. The polarization conversion can also be achieved by the above-described configuration.

Example 3 of Light Source Apparatus

Another example of the light source apparatus is illustrated in FIGS. 24 to 25. In addition, the arrangement of the light source apparatus and the image display panel 11 of this example is also illustrated in FIGS. 24 to 25. The light source apparatus converts the divergent light flux of the natural light (that is the mixture of the P-polarized wave and the S-polarized wave) from the LED into the substantially collimated light flux by using an LED collimator 18, and the light flux is then reflected by the reflection type light guide 304 toward the image display panel 11. The specific polarized wave of the reflected light is reflected by the waveplate and/or the reflection type polarizing plate 206 arranged between the image display panel 11 and the reflection type light guide 304, and the other polarized wave penetrates these members, and enters the image display panel 11. The specific polarized wave (for example, the S-polarized wave) is reflected by the reflection type polarizing plate, the wave having the phase converted by the waveplate returns to the reflection surface and passes through the retardation plate again, so that the wave is converted into the polarized wave (for example, the P-polarized wave) that penetrates the reflection type polarizing plate. Alternatively, the specific polarized wave (for example, S-polarized wave) reflected by the reflection type polarizing plate 206 penetrates the transmission portion of the reflection type light guide 304, and is reflected by the reflection plate 310 provided on the opposite surface of the reflection type light guide 304. The retardation plate is arranged between the reflection type light guide 304 and the reflection plate 310, and the wave passes through the retardation plate 309 twice, and is converted into the polarized wave (for example, the P-polarized wave) that penetrates the reflection type polarizing plate.

As a result, the natural light from the LED is unified into the specific polarized wave (for example, the P-polarized wave). As similar to the above-described example, the plurality of LEDs (only one LED is illustrated in FIGS. 24 and 25) constituting the light source are illustrated, and the LEDs are installed to a predetermined position of the LED collimator 18. Each of the LED collimators 18 is made of, for example, a light-transmittable resin such as acrylic resin or glass. The LED collimator 18 has a conical convex outer peripheral surface obtained by rotating a paraboloid cross section, a top of which has a concave portion with a convex center portion (that is, the convex lens surface), and a center of a flat surface of which has a convex lens surface protruding outward (alternatively, may be a concave lens surface recessed inward). The paraboloid surface forming the conical outer peripheral surface of the LED collimator 18 is designed within the range of angles at which the peripherally-emitting light from the LED collimator 18 can be totally reflected inside the light receiving portion, or is provided with a reflection surface.

In addition, each of the LEDs is arranged at the predetermined position on the surface of the LED substrate 102 serving as the circuit board of the LED. The LED substrate 102 is arranged and fixed to the LED collimator 18 such that the LED on the surface of the LED substrate 102 is positioned at the central portion of the concave portion.

According to such a configuration, in particular, the light emitted from the central portion of the light emitted from the LED by the above-described LED collimator 18 is collected by the two convex lens surfaces forming the outer shape of the LED collimator 18 and is converted to the collimated light. In addition, the light peripherally emitted from the other portions is reflected by the paraboloid surface forming the conical outer peripheral surface of the LED collimator 18, and is similarly collected and converted to the collimated light. In other words, according to the LED collimator 18 having the convex lens at the central portion and the paraboloid surface at the peripheral portion, almost all the light generated by the LED can be extracted as the collimated light, and the utilization efficiency of the generated light can be improved.

In the cross-sectional views illustrated in FIGS. 24(*a*) and 25(*a*), an optical element 303 that converts the dispersion characteristics in the vertical direction and the horizontal direction (that is a front-and-back direction in the drawing although not illustrated) of the drawing may be provided on the light emission side of the LED collimator 18. In order to efficiently emit the light to the reflection surface of the light guide, it is preferable to optimally design the number of LEDs and the divergence angle caused by the optical element 303 as design parameters so that the dispersion angle in the vertical direction of the screen is aligned with the width of the vertical surface of the reflection surface of the light guide while the horizontal-direction surface density of the light flux emitted from the image display panel 11 is uniform.

As the retardation plate between the reflection type polarizing plate and the reflection type light guide, for example, when the one having the characteristics of reflecting the S-polarized light (transmitting the P-polarized light) is selected, the S-polarized wave of the natural light emitted from the LED serving as the light source is reflected, passes through a waveplate provided illustrated in FIG. 24 and others, is reflected by the reflection surface, and passes through the waveplate again to be converted into the P-polarized wave and enter the image display panel 11. For the thickness of the waveplate, it is necessary to select an optimal value depending on the incident angle of the light beam on the waveplate, and the optimal value exists in the range of λ/16 to λ/4. At this time, it is possible to improve the uniformity of brightness by designing the incident angle on the liquid crystal display panel to be constant over the entire screen region while using the reflection angle on the reflection type light guide as the design parameter. Alternatively, it is possible to improve the uniformity of brightness by designing the incident angle on the liquid crystal display panel to be constant over the entire screen region while using the reflection angle on the above-described reflection type polarizing plate as the design parameter.

The light source apparatus 48 of FIGS. 24(b) and 25(b) may be provided with a polarization conversion prism 21 on the light emission surface of the LED collimator 18 to increase the polarization level and achieve a high contrast.

Furthermore, by using the light source apparatus according to the preset embodiment as described above, it is possible to provide the image display apparatus having the narrow dispersion characteristics as illustrated in the examples 1 and 2 of FIGS. 31(a) and 31(b). When the image display apparatus 49 is used for a vehicle, since the distance between the image display apparatus 48 viewed through the windshield 6 and the driver's eyes is equivalent to 1 <m>, the dispersion characteristics close to the middle between the example 1 and the example 2 illustrated in FIG. 31 matches with that in a case of a panel size of 7 inches. On the other hand, in a case of application of the apparatus as the tablet terminal for outdoor use, since the distance of clear vision is 0.3 (m), wide dispersion characteristics are required, and the characteristics of the example 2 matches with this case, and thus, it is desirable to optimally design the surface shape and surface roughness of the light reflection surface of the light guide as parameters in accordance with the application.

<Lenticular Lens Sheet>

In order to control the dispersion distribution of the image light output from the image display panel 11, it is also possible to control the emission characteristics in one direction in addition to the control of the emission light by the light source apparatus described above, by providing a lenticular lens between the light source apparatus 101 and the image display panel 11 or on the surface of the image display panel 11 and optimizing the lens shape. Further, it is also possible to independently or simultaneously control the emission characteristics of the image light flux output from the image display apparatus 49 in the X-axis direction and the Y-axis direction by arranging a microlens array in a matrix, so that the different directionality can be provided to the central portion and the peripheral portion of the screen of the liquid crystal panel 11, and an image display apparatus having the desired dispersion characteristics can be provided.

Next, the action of the lenticular lens will be described. In the lenticular lens, the directionality of the emitted light flux from the image display apparatus 49 can be controlled by optimizing the lens shape to efficiently reflect or disperse the emitted light flux on the transparent sheet 7b provided inside the windshield 6 or the transparent sheet 51 provided on the front surface. That is, it is possible to control the luminance (relative luminance) of the image light output from the image display apparatus 49 in the X-axis direction and the Y-axis direction in accordance with the reflection angle (0 degree in the vertical direction) by combining two lenticular lenses or arranging the microlens array in the matrix to provide a sheet that controls the dispersion characteristics. In the present embodiment, because of such a lenticular lens, the luminance (relative luminance) of the light depending on reflection and dispersion is increased by making the luminance characteristics in the vertical direction steep as illustrated in FIG. 31(b) and changing the balance of the directionality in the up and down directions (positive and negative directions of the Y axis) as compared with the related-art one, and therefore, the image light having the narrow dispersion angle (high straight propagation) and only containing the specific polarized wave component is provided as if the image light was the image light output from the plane-emitting laser image source, and thus, efficiently reaches the eyes of the observer.

On the other hand, because of the above-described light source apparatus, it is possible to provide the image display apparatus that emits the light of the specific polarized wave emitting the image light flux nearly parallel to the specific direction by providing the significantly narrow directionality in both the X-axis direction and the Y-axis direction to the dispersion characteristics of the emission light output from the general (denoted as related-art in the drawing) liquid crystal panel illustrated in FIGS. 31(a) and 31(b).

FIG. 30 illustrates an example of the characteristics of the light source apparatus adopted in the present embodiment. The peak luminance is inclined at 30 degrees in the X direction (vertical direction) by adding the characteristics of the lenticular lens described above. Specifically, characteristics "O" indicates luminance characteristics, a peak of which in the light emission direction is at an angle of about 30 degrees upward from the vertical direction (0 degree) and which are symmetric in the up and down directions. In addition, characteristics "A" and characteristics "B" in FIG. 30 are illustrated as characteristic examples in which the image light above the peak luminance is collected to increase the luminance (relative luminance) at around 30 degrees. Therefore, at an angle exceeding 30 degrees in the characteristics A and B, the luminance (relative luminance) of the light is sharply reduced as compared with the characteristics O.

According to the optical system including the light source apparatus adopted in the above-described present embodiment, as illustrated in FIG. 26, the image light output from the image display apparatus 49 can be reflected or dispersed while the luminance in the specific direction is increased (emphasized) through the transparent sheet 51 provided on the surface of the windshield 6 described below. By this configuration, the image light output from the image display apparatus 49 can be converted to have the narrow dispersion angle (high straight propagation) and only containing the specific polarized wave component as if the image light was the image light output from the plane-emitting laser image source, and thus, can efficiently reach the eyes of the observer outside or inside the cabin. As a result, even if the intensity (luminance) of the image light output from the image display apparatus 49 is reduced, the observer can accurately recognize the image light and obtain information. In other words, it is possible to provide an information display system with low power consumption by further reducing the output of the image display apparatus 49.

In a general thin film transistor (TFT) liquid crystal panel, the luminance and contrast performance differ depending on a light emission direction due to mutual characteristics between the liquid crystal and the polarizing plate. These characteristics are excellent at an angle (+5 degrees in the present embodiment) slightly shifted from the emission angle vertical to the panel surface (the emission angle of 0 degree). This is because the characteristics of twisting the light in the up and down directions of the liquid crystal does not become 0 degree at the maximum applied voltage.

Meanwhile, the contrast performance in the up and down directions is excellent in the range of −15 degrees to +15 degrees, and therefore, the most excellent characteristics including the luminance characteristics are provided when the application is in the range of ±10 degrees around 5 degrees.

In addition, the characteristics of the luminance and the viewing angle in the left and right directions of the panel are excellent at the emission angle vertical to the panel surface (the emission angle of 0 degree). This is because the characteristics of twisting the light in the left and right directions of the liquid crystal becomes 0 degree at the maximum applied voltage.

Similarly, the contrast performance in the left and right directions is excellent in the range of −5 degrees to −10 degrees, and therefore, the most excellent characteristics including the luminance characteristics are provided when the application is in the range of ±5 degrees around −5 degrees. For this reason, the image quality and the performance of the image display apparatus 49 are improved by configuring the emission angle of the image light emitted from the liquid crystal display panel to bring the light enter the liquid crystal display panel in the direction providing the most excellent characteristics and to modulate the light in accordance with the image signal by using the light flux direction conversion means 204 provided in the light guide 203 of the light source apparatus 250 in FIGS. 22 and 23.

In order to bend the image light output from the image display panel including the liquid crystal display element in a desired direction, it is preferable to provide the light flux direction conversion means 54 using the lenticular lens sheet or the like on the emission surface of the liquid crystal display panel.

<Effect 1 of Transparent Sheet>

The windshield 6 of the automobile illustrated in FIG. 7 is provided with the transparent sheet 7b according to the embodiment of the present application. A more detailed configuration and its effect will be described with reference to FIG. 8. The sunlight poured into the automobile is natural light that is the mixture of the P-polarized wave and the S-polarized wave. Since the S-polarized light has a high reflectance on the windshield 6, the emitted sunlight is as the light containing a high ratio of the P-polarized wave. FIG. 8 illustrates a configuration of the transparent sheet 7b that reflects the image light flux into the vehicle, the principle for reducing the double images by blocking the sunlight, and the like. The transparent sheet 7b is provided on an image light flux incident surface side of a shatterproof sheet 7 that prevents the glass inside the windshield 6 from being shattered when damaged. The transparent sheet 7b includes the retardation plate (λ/2 plate) that converts the passing sunlight containing the high ratio of the P-polarized wave into the S-polarized light, and converts the transmitted polarized light into the S-polarized light. As a result, the light is reflected by the vehicle interior surface of the windshield 6 with a high reflectance, and is directed toward the outside of the vehicle. At this time, since the light passes through the retardation plate (λ/2 plate) again to be converted into the P-polarized light, the reflection on the surface of the windshield 6 in contact with the outside of the vehicle is reduced. As a result, the sunlight entering the vehicle is significantly reduced, and thus, the stress (load) on the image display panel 11 constituting the image display apparatus 49 is reduced.

<Effect 2 of Transparent Sheet>

Next, a second effect of the above-described transparent sheet will be described. In the image display apparatus 49, the image light of the S-polarized light whose intensity is modulated in accordance with the image signal is reflected by the image light incident surface of the windshield 6, and is directed toward the observer. However, the light having penetrated the image light incident surface passes through the retardation plate (λ/2 plate) and is converted into the P-polarized light. As a result, since the surface of the windshield 6 in contact with the outside has a low reflectance, the double image due to reflection on both surfaces of the windshield 6 is reduced down to a practically acceptable level. It is preferable to select the optimal thickness of the above-described retardation plate (λ/2 plate) in accordance with the incident angle and the angle distribution of the image light output from the image display apparatus 49 to the windshield 6, it is preferable to select the optimal value in accordance with the dispersion characteristics of the transparent dispersion sheet, and better characteristics in the case of the large incident angle can be obtained by reducing the thickness of the retardation plate to be smaller than that in the case of the vertical incidence.

In addition, it has been confirmed that providing the above-described transparent sheet 7b on the vehicle interior side surface of the windshield 6 and providing enhanced reflection coating having an increased reflectance of the S-polarized wave on the side surface can not only achieve a high-luminance image but also significantly reduce the intensity of the double image relatively generated by the reflected image.

Furthermore, in place of the above-described transparent sheet, for example, PDLC (Polymer Dispersed Liquid Crystal) of Suntech Display Co., Ltd., may be used as an alternative transparent sheet on the rear glass 6' to disperse the image light without applying a voltage in the image display state but make the rear glass 6' transparent with applying a voltage in the image non-display state. In addition, the inventors have experimentally found that it is possible to provide a window glass having a screen function that offers a new function of making the transmittance variable in accordance with the image by varying the voltage applied to the PDLC to vary the dispersion characteristics and modulating the applied voltage in synchronization with ON/OFF or the intensity level of the image signal. As a result, an image information display system having a desired monitoring range can be provided by dispersing the narrow image light flux output from the image display apparatus in the vertical and horizontal directions toward the inside and outside of the automobile.

According to the embodiment described in detail above, the image light output from the image display apparatus 49 can be converted into the light having the narrow dispersion angle (high straight propagation) and containing only the specific polarized wave component as if the image light was the image light output from the plane-emitting laser image source. This enables various information to be displayed toward the inside and the outside of the vehicle by, for example, using each window glass that separates the inside and the outside, and it is possible to remarkably improve the utilization efficiency of the automobile as a moving image advertisement body. In addition, it is possible to achieve an information display system that can display a high-quality image with a high resolution and improve the utilization efficiency of light emitted from the light source to significantly reduce the power consumption. Furthermore, when a larger image is displayed, a liquid crystal display apparatus having an aspect ratio of 16:9 or wider is provided by combining a plurality of liquid crystal panels serving as the image display panel 11 including the liquid crystal display element constituting the image display apparatus 49 together with the light source apparatus 101.

At this time, a plurality of light source apparatuses may be provided to correspond to the respective liquid crystal panels, and it is also possible to adopt a large image display panel 11 having a continuously unified joint portion by combining a different number of light source apparatuses from the number of the plurality of liquid crystal panels. In this case, it is also possible to display more enlarged image information while significantly reducing the power consumption by directing the light flux output from the light source apparatus 101 to the above-described transparent sheet 7b, 51 provided in parallel with the window glass and reflecting/dispersing the light flux in one direction at the transparent sheet.

Various embodiments have been described in detail above. However, the present invention is not limited to the above-described embodiments, and includes various modifications. For example, in the above-described embodiments, the entire system has been explained in detail for easily understanding the present invention, and is not always limited to the one including all structures explained above. Also, a part of the structure of one embodiment can be replaced with the structure of another embodiment, and besides, the structure of another embodiment can be added to the structure of one embodiment. Further, another structure can be added to/eliminated from/replaced with a part of the structure of each embodiment.

EXPLANATION OF REFERENCE CHARACTERS 6 windshield
6" side glass
11 image display panel
15 LED collimator
21 polarization conversion element
43 steering wheel
50 sunlight
41 protective cover
48 light source apparatus
49 image display apparatus
7b, 51 transparent sheet
54 light flux direction conversion means
301 combiner
200 LED element
202 LED substrate
203 light guide
205 reflection sheet
42 instrument panel
304 reflection type light guide

The invention claimed is:

1. An information display system that allows an observer to visually recognize an image displayed on an image display apparatus by superimposing the image on an external scenery through a window glass, the information display system comprising:
a light source apparatus configured to supply light having a specific polarization direction at a narrow divergence angle to the image display apparatus,
wherein a reflection position of the image is changed by arranging a position and an angle of the image display apparatus with respect to the window glass so that the position and the angle change in combination while a monitoring angle of the image visually recognized by the observer is constant, and a virtual image display distance of the image visually recognized by the observer and a size of the image of the virtual image can be changed.

2. The information display system according to claim 1, wherein the light source apparatus includes:
a point or planar light source;
an optical element configured to reduce a divergence angle of light output from the light source;
a light guide configured to have a reflection surface that reflects the light output from the light source and propagates the light to the image display apparatus; and
a retardation plate and a reflection surface configured to face the other surface of the light guide in an order from the light guide,
the reflection surface provided on the light guide is arranged so as to reflect the light output from the light source and propagate the light to the image display apparatus facing the light guide,
a reflection type polarizing plate is arranged between the reflection surface of the light guide and the image display apparatus,
light having a specific polarization direction reflected by the reflection type polarizing plate is reflected by the reflection surface close to and face the other surface of the light guide, passes through the retardation plate arranged between the light guide and the reflection surface twice to undergo polarization conversion, and passes through the reflection type polarizing plate to propagate the light having the specific polarization direction to the image display apparatus, and
a part or all of a divergence angle of a light flux entering the image display apparatus from the light source is controlled by a shape and surface roughness of the reflection surface provided in the light source apparatus.

3. The information display system according to claim 2, wherein the divergence angle of the light entering the image display apparatus is ±30 degrees or less.

4. The information display system according to claim 2, wherein the divergence angle of the light entering the image display apparatus is ±10 degrees or less.

5. The information display system according to claim 2, wherein a horizontal dispersion angle and a vertical dispersion angle of the light entering the image display apparatus are different from each other.

6. The information display system according to claim 2, wherein the image display apparatus includes a liquid crystal display element, and has contrast performance obtained by multiplying a contrast resulted from characteristics of polarizing plates provided on a light incident surface and a light emission surface by a reciprocal of a cross transmittance of the reflection type polarizing plate.

7. A head-up display apparatus that allows an observer to visually recognize an image displayed on an image display apparatus by superimposing the image on an external scenery through a window glass, the information display system comprising:
a light source apparatus configured to supply light having a specific polarization direction at a narrow divergence angle to the image display apparatus,
wherein a reflection position of the image is changed by arranging a position and an angle of the image display apparatus with respect to the window glass so that the position and the angle change in combination while a monitoring angle of the image visually recognized by the observer is constant, and a virtual image display distance of the image visually recognized by the observer and a size of the image of the virtual image can be changed.

8. The head-up display apparatus according to claim 7, wherein the light source apparatus includes:
a point or planar light source;
an optical element configured to reduce a divergence angle of light output from the light source;
a light guide configured to have a reflection surface that reflects the light output from the light source and propagates the light to the image display apparatus; and
a retardation plate and a reflection surface configured to face the other surface of the light guide in an order from the light guide,
the reflection surface provided on the light guide is arranged so as to reflect the light output from the light source and propagate the light to the image display apparatus facing the light guide,
a reflection type polarizing plate is arranged between the reflection surface of the light guide and the image display apparatus,
light having a specific polarization direction reflected by the reflection type polarizing plate is reflected by the reflection surface close to and face the other surface of the light guide, passes through the retardation plate arranged between the light guide and the reflection surface twice to undergo polarization conversion, and passes through the reflection type polarizing plate to propagate the light having the specific polarization direction to the image display apparatus, and
a part or all of a divergence angle of a light flux entering the image display apparatus from the light source is controlled by a shape and surface roughness of the reflection surface provided in the light source apparatus.

9. The head-up display apparatus according to claim 8, wherein the divergence angle of the light entering the image display apparatus is ±30 degrees or less.

10. The head-up display apparatus according to claim 8, wherein the divergence angle of the light entering the image display apparatus is ±10 degrees or less.

11. The head-up display apparatus according to claim 8, wherein a horizontal dispersion angle and a vertical dispersion angle of the light entering the image display apparatus are different from each other.

12. The head-up display apparatus according to claim 8, wherein the image display apparatus includes a liquid crystal display element, and has contrast performance obtained by multiplying a contrast resulted from characteristics of polarizing plates provided on a light incident surface and a light emission surface by a reciprocal of a cross transmittance of the reflection type polarizing plate.

13. A light source apparatus, wherein the light source apparatus includes:
a point or planar light source;
an optical element configured to reduce a divergence angle of light output from the light source;
a light guide configured to have a reflection surface that reflects the light output from the light source and propagates the light to the image display apparatus; and
a retardation plate and a reflection surface configured to face the other surface of the light guide in an order from the light guide,
the reflection surface provided on the light guide is arranged so as to reflect the light output from the light source and propagate the light to the image display apparatus facing the light guide,
a reflection type polarizing plate is arranged between the reflection surface of the light guide and the image display apparatus,
light having a specific polarization direction reflected by the reflection type polarizing plate is reflected by the reflection surface close to and face the other surface of the light guide, passes through the retardation plate arranged between the light guide and the reflection surface twice to undergo polarization conversion, and passes through the reflection type polarizing plate to propagate the light having the specific polarization direction to the image display apparatus, and
a part or all of a divergence angle of a light flux entering the image display apparatus from the light source is controlled by a shape and surface roughness of the reflection surface provided in the light source apparatus.

* * * * *